US010823857B2

(12) United States Patent
Cho

(10) Patent No.: US 10,823,857 B2
(45) Date of Patent: Nov. 3, 2020

(54) RADIATION DETECTOR, TOMOGRAPHY IMAGING APPARATUS THEREOF, AND RADIATION DETECTING APPARATUS THEREOF

(71) Applicant: SAMSUNG ELECTRONICS CO., LTD., Suwon-si (KR)

(72) Inventor: Min-kook Cho, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 182 days.

(21) Appl. No.: 15/934,307

(22) Filed: Mar. 23, 2018

(65) Prior Publication Data

US 2018/0217271 A1 Aug. 2, 2018

Related U.S. Application Data

(63) Continuation of application No. 14/591,404, filed on Jan. 7, 2015, now Pat. No. 9,964,650.

(30) Foreign Application Priority Data

Jan. 7, 2014 (KR) .................. 10-2014-0002039
Dec. 23, 2014 (KR) .................. 10-2014-0187504

(51) Int. Cl.
*G01T 1/161* (2006.01)
*G01T 1/24* (2006.01)
(Continued)

(52) U.S. Cl.
CPC ............... *G01T 1/161* (2013.01); *G01T 1/18* (2013.01); *G01T 1/247* (2013.01); *G01T 1/366* (2013.01)

(58) Field of Classification Search
CPC ........... G01T 1/161; G01T 1/18; G01T 1/247; G01T 1/366
See application file for complete search history.

(56) References Cited

U.S. PATENT DOCUMENTS 5,943,388 A * 8/1999 Tumer ................ G01V 5/0041
378/98.11
7,518,116 B2 4/2009 Janssen et al.
(Continued)

FOREIGN PATENT DOCUMENTS

CN 101074993 A 11/2007
CN 101228437 A 7/2008
(Continued)

OTHER PUBLICATIONS

Communication dated Jul. 16, 2019, from the European Patent Office in counterpart European Application No. 15150293.7.
(Continued)

*Primary Examiner* — David P Porta
*Assistant Examiner* — Jeremy S Valentiner
(74) *Attorney, Agent, or Firm* — Sughrue Mion, PLLC

(57) ABSTRACT

A radiation detector includes a plurality of pixels configured to detect radiation, and at least one of the plurality of pixels includes a radiation absorbing layer configured to convert photons incident on the radiation absorbing layer into a first electrical signal, and a photon processor including a plurality of storages configured to count and store the number of the photons based on the first electrical signal. At least one of the plurality of storages is configured to compare the first electrical signal with a first reference value to obtain a second electrical signal, and count and store the number of the photons based on a third electrical signal that is obtained based on a comparison of the second electrical signal with a second reference value.

8 Claims, 25 Drawing Sheets

(51) Int. Cl.
  *G01T 1/36* (2006.01)
  *G01T 1/18* (2006.01)

(56) References Cited

U.S. PATENT DOCUMENTS

| | | | |
|---|---|---|---|
| 8,000,434 | B2 | 8/2011 | Ziegler et al. |
| 8,319,187 | B2 | 11/2012 | Kim et al. |
| 9,354,331 | B2 | 5/2016 | Sagoh et al. |
| 9,964,650 | B2 * | 5/2018 | Cho .................. G01T 1/18 |
| 2002/0029122 | A1 | 3/2002 | Mizuno |
| 2007/0120062 | A1 * | 5/2007 | Li .................. H01L 27/14603 |
| | | | 250/370.09 |
| 2008/0099689 | A1 * | 5/2008 | Nygard ............... G01T 1/2018 |
| | | | 250/370.09 |
| 2008/0205585 | A1 | 8/2008 | Proksa |
| 2009/0039273 | A1 | 2/2009 | Tkaczyk et al. |
| 2009/0304149 | A1 | 12/2009 | Herrmann et al. |
| 2010/0181491 | A1 | 7/2010 | Karim |
| 2010/0193700 | A1 | 8/2010 | Herrmann et al. |
| 2011/0036988 | A1 * | 2/2011 | Campbell ............... G01T 1/026 |
| | | | 250/370.07 |
| 2011/0036989 | A1 | 2/2011 | Marks et al. |
| 2011/0168909 | A1 | 7/2011 | Nakao |
| 2012/0097856 | A1 | 4/2012 | Chappo et al. |
| 2013/0010921 | A1 | 1/2013 | Sagoh et al. |
| 2013/0105701 | A1 * | 5/2013 | Han .................... G01T 1/18 |
| | | | 250/394 |
| 2014/0016748 | A1 * | 1/2014 | Spahn ................ G01T 1/247 |
| | | | 378/62 |

FOREIGN PATENT DOCUMENTS

| | | | |
|---|---|---|---|
| CN | 101578535 | A | 11/2009 |
| CN | 101680954 | A | 3/2010 |
| CN | 102016637 | A | 4/2011 |
| CN | 102958439 | A | 3/2013 |
| EP | 2028509 | A1 | 2/2009 |
| EP | 2589986 | A2 | 5/2013 |
| KR | 10-2011-0018995 | A | 2/2011 |
| KR | 10-2011-0059988 | A | 6/2011 |
| KR | 10-2012-0048721 | A | 5/2012 |
| WO | 02/057807 | A1 | 7/2002 |
| WO | 2006117720 | A2 | 11/2006 |
| WO | 2009/133481 | A2 | 11/2009 |
| WO | 2010109355 | A1 | 9/2010 |
| WO | WO-2012173206 | A1 * | 12/2012 ............ A61B 6/032 |
| WO | 2013093684 | A2 | 6/2013 |

OTHER PUBLICATIONS

Communication dated Feb. 27, 2019 issued by the State Intellectual Property Office of P.R. China in counterpart Chinese Application No. 201580012594.0.

Communication dated Sep. 2, 2016, issued by the Korean Intellectual Property Office in counterpart Korean application No. 10-2014-0187504.

Communication dated Apr. 10, 2015, issued by the International Searching Authority in counterpart International Application No. PCT/KR2015/000108.

Communication dated Jun. 1, 2015, issued by the European Patent Office in counterpart European Application No. 15150293.7.

Communication dated Jun. 5, 2018, issued by the State Intellectual Property Office of P.R. China in counterpart Chienese Application No. 201580012594.0.

Communication dated Jun. 6, 2018, issued by the European Patent Office in counterpart European Application No. 15 150 293.7.

\* cited by examiner

FIG. 5B

| ITEM | MODELED VALUE | UNIT |
|---|---|---|
| Mean Photon Energy | 60.605 | [Kev] |
| 1st Half Value Layer | 6.886 | [mm Al] |
| Exposure | 7.739 | [mR/mAs] @ 1.0 [m] |
| Air Kerma | 67.799 | [uGy/mAs] @ 1.0 [m] |
| Fluence | 2,004,955 | [photons/mm$^2$/mAs] @ 1.0 [m] |

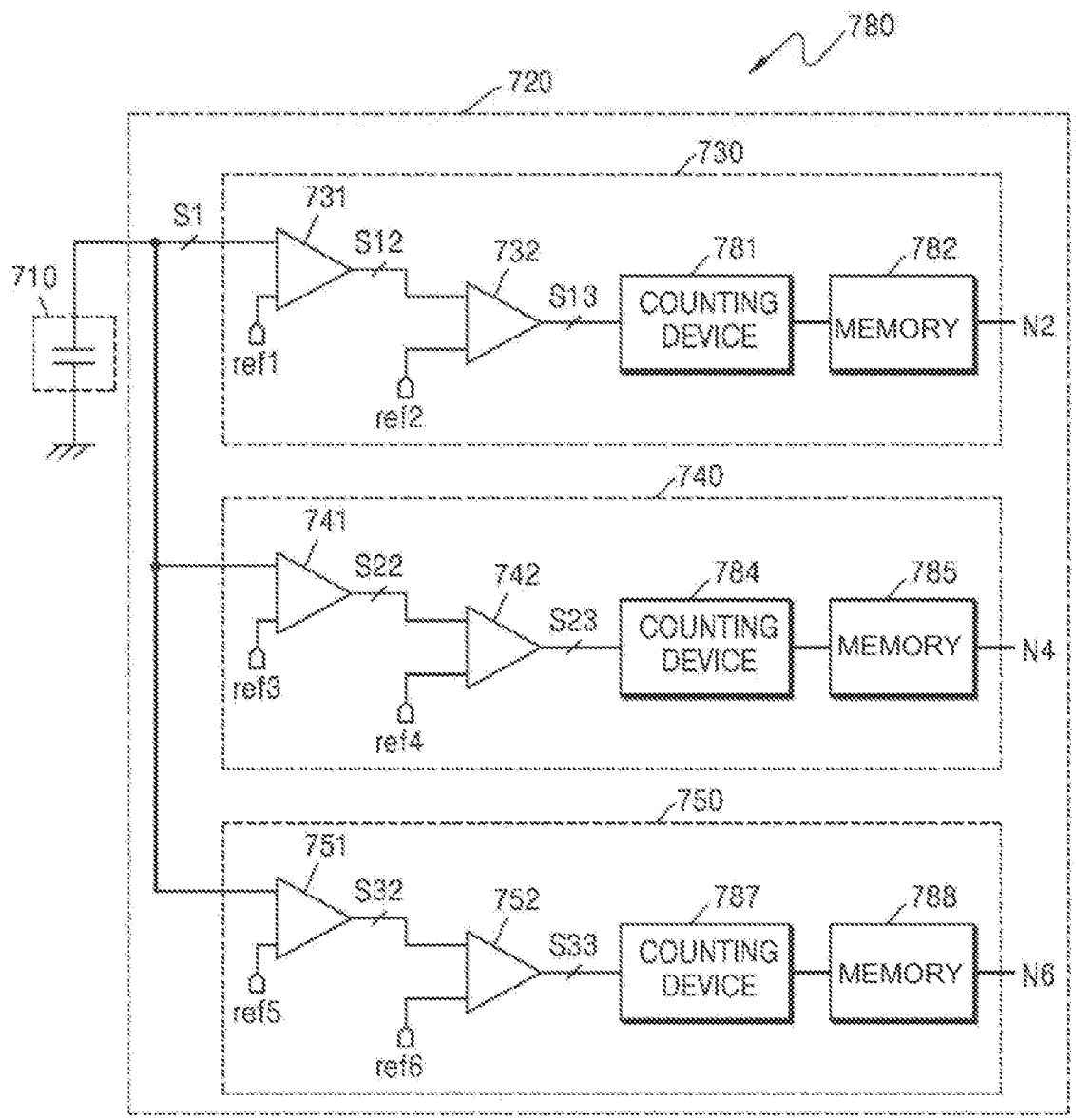

RADIATION DETECTOR, TOMOGRAPHY IMAGING APPARATUS THEREOF, AND RADIATION DETECTING APPARATUS THEREOF

CROSS-REFERENCE TO RELATED APPLICATIONS

This application is a continuation application of U.S. patent application Ser. No. 14/591,404, filed on Jan. 7, 2015, which claims the benefit of Korean Patent Application No. 10-2014-0002039, filed on Jan. 7, 2014, in the Korean Intellectual Property Office, and Korean Patent Application No. 10-2014-0187504, filed on Dec. 23, 2014, in the Korean Intellectual Property Office, the disclosures of which are incorporated herein in their entirety by reference.

BACKGROUND

1. Field

One or more exemplary embodiments relate to a radiation detector that counts the number of incident photons, a tomography imaging apparatus thereof, and an X-ray imaging apparatus thereof, and more particularly, to a radiation detector that sorts incident radiation photons according to a plurality of energy bands and counts the number of the incident radiation photons, a tomography imaging apparatus thereof, and an X-ray imaging apparatus thereof.

2. Description of the Related Art

A medical imaging apparatus is an apparatus for obtaining an image of an internal structure of an object. A medical image processing apparatus is a non-invasive examination apparatus which photographs, processes, and shows structural details, internal tissue, and fluid flow of a human body to a user. The user, such as a doctor, may diagnose a health state and a disease of a patient by using a medical image that is output from the medical image processing apparatus.

Representative examples of an apparatus for photographing an object by irradiating radiation to a patient include a computed tomography (CT) apparatus and an X-ray apparatus.

Among medical image processing apparatuses, a CT imaging apparatus is widely used to precisely diagnose a disease because the CT imaging apparatus may provide a cross-sectional image of an object and express internal structures (for example, organs such as a kidney and a lung) of the object so as not to overlap with each other, unlike general X-ray apparatuses.

An x-ray apparatus is a medical imaging apparatus that transmits X-rays through a human body and obtains an image of an internal structure of the human body. The X-ray apparatus may be more conveniently used and may obtain a medical image of an object in a shorter time than other medical imaging apparatuses such as a magnetic resonance imaging (MRI) apparatus and a CT imaging apparatus. Accordingly, the X-ray apparatus is widely used to perform a simple chest x-ray procedure, a simple abdomen x-ray procedure, a simple skeleton x-ray procedure, a simple paranasal sinus x-ray procedure, a simple neck soft tissue x-ray procedure, and a breast x-ray procedure.

A medical imaging apparatus for photographing an object by irradiating radiation, such as a CT imaging apparatus or an X-ray apparatus, includes a radiation detector for detecting the radiation that passes through the object. A medical image of the object may be accurately reconstructed when the radiation detector accurately detects the radiation that passes through the object.

SUMMARY

One or more exemplary embodiments provide a radiation detector for measuring multi-energy which may minimize a size of a pixel and may increase the number of distinguished energy bands, a tomography imaging apparatus thereof, and an X-ray imaging apparatus thereof.

One or more exemplary embodiments also provide a radiation detector for measuring multi-energy which may more accurately sort and count photons according to energy bands, a tomography imaging apparatus thereof, and an X-ray imaging apparatus thereof.

Additional aspects will be set forth in part in the description which follows and, in part, will be apparent from the description, or may be learned by practice of the presented exemplary embodiments.

According to an aspect of an exemplary embodiment, there is provided, a radiation detector including a plurality of pixels configured to detect radiation, wherein at least one of the plurality of pixels includes: a radiation absorbing layer configured to convert photons incident on the radiation absorbing layer into a first electrical signal; and a photon processor including a plurality of storages configured to count and store a number of the photons based on the first electrical signal, wherein at least one of the plurality of storages is configured to compare the first electrical signal with a first reference value to obtain a second electrical signal, and count and store the number of the photons based on a third electrical signal that is obtained based on a comparison of the second electrical signal with a second reference value.

At least one of the first and second reference values may be set to have a first value in at least one of the pixels among the plurality of pixels and set to have a second value different from the first value in at least another of the pixels among the plurality of pixels.

The at least one storage may include: a first comparator configured to, when the first electrical signal is equal to or greater than the first reference value, output the second electrical signal corresponding to a difference value between the first electrical signal and the first reference value; a second comparator configured to compare the second electrical signal with the second reference value and output the third electrical signal; and a first counter configured to count and store the number of the photons based on the third electrical signal.

The first electrical signal may be a voltage signal that corresponds to energy of the photons, the first reference value may be a voltage value, and the second reference value may be a current value.

The at least one storage may further include a second counter configured to, when the first electrical signal is equal to or greater than the first reference value, count and store the number of the photons based on the second electrical signal.

At least one of the first reference value and the second reference value may be set to have different values in each pixel in a pixel group including a plurality of adjacent pixels among the plurality of pixels.

The second reference value that is used in the at least one storage may be set to have different values in a first pixel and a second pixel that is adjacent to the first pixel from among the plurality of pixels.

The second reference value that is applied to the first pixel may be greater or less than the second reference value that is applied to the second pixel.

The first reference value that is used in the at least one storage may be set to have different values in a first pixel and a second pixel that is disposed adjacent to the first pixel from among the plurality of pixels.

A size of the at least one storage may be determined based on at least one of the first reference value and the second reference value.

The at least one storage may have a first bit depth when an energy band of the counted photons is a low energy band, and may have a second bit depth when the energy band of the counted photons is a high energy band which is higher than the low energy band.

The radiation detector may be a radiation detector using a direct method of generating a computed tomography (CT) image based on the counted photons.

The radiation absorbing layer may be disposed in a front portion of the radiation detector, and the photon processing unit is disposed in a rear portion of the radiation detector opposite the front portion.

The radiation absorbing layer may include cadmium telluride (CdTe) or cadmium zinc telluride (CdZnTe).

According to another aspect of an exemplary embodiment, there is provided a radiation detector including a plurality of pixels configured to detect radiation, wherein at least one of the plurality of pixels includes a plurality of sub-pixels, wherein at least one of the plurality of sub-pixels includes: a radiation absorbing layer configured to convert photons incident on the radiation absorbing layer into a first electrical signal; and a photon processor including a plurality of storages configured to count and store a number of the photons based on the first electrical signal, wherein at least one of the plurality of storages is configured to compare the first electrical signal with a first reference value to obtain a second electrical signal, and count and store the number of the photons based on a third electrical signal that is obtained based on a comparison of the second electrical signal with a second reference value.

At least one of the first and second reference values may be set to have a first value in at least one sub-pixel among the plurality of sub-pixels and set to have a second value different from the first value in at least another of the sub-pixels among the plurality of sub-pixels.

The at least one storage may include: a first comparator configured to, when the first electrical signal is equal to or greater than the first reference value, output the second electrical signal corresponding to a difference value between the first electrical signal and the first reference value; a second comparator configured to compare the second electrical signal with the second reference value and output the third electrical signal; and a first counter configured to count and store the number of the photons based on the third electrical signal.

The first electrical signal may be a voltage signal corresponding to energy of the photons that are incident on the radiation absorbing layer, the first reference value may be a first voltage value, and the second reference value may be a first current value.

The at least one storage may further include a second counter configured to, when the first electrical signal is equal to or greater than the first reference value, count and store the number of the photons based on the second electrical signal.

At least one of the first reference value and the second reference value may be set to have different values in each sub-pixel in a sub-pixel group including a plurality of adjacent sub-pixels among the plurality of sub-pixels.

The second reference value that is used in the at least one storage may be set to have different values in a first sub-pixel and a second sub-pixel that is disposed adjacent to the first sub-pixel from among the plurality of sub-pixels.

The second reference value that is applied to the first sub-pixel may be greater than the second reference value that is applied to the second sub-pixel.

The first reference value that is used in the at least one storage may be set to have different values in a first sub-pixel and a second sub-pixel that is disposed adjacent to the first sub-pixel from among the plurality of sub-pixels.

A size of the at least one storage may be determined based on at least one of the first reference value and the second reference value.

The at least one storage may have a first bit depth when an energy band of the counted photons is a low energy band, and have a second bit depth that is less than the first bit depth when the energy band of the counted photons is a high energy band which is higher than the low energy band.

The radiation detector may be configured to detect the radiation that is emitted from an X-ray source, which is attached to a gantry and rotates, and the radiation passes through an object.

The radiation detector may be a radiation detector using a direct method of generating a multi-energy computed tomography (CT) image based on the counted photons.

The radiation detector may be configured to detect the radiation that is emitted from an X-ray source, which is attached to a movable apparatus and allows its position to be adjusted, and the radiation passes through an object.

The radiation detector may be used to generate a multi-energy X-ray image.

According to another aspect of an exemplary embodiment, there is provided a radiation detecting apparatus for detecting radiation, the radiation detector including a plurality of image pixels each including at least one counting pixel and configured to restore an image, wherein the at least one counting pixel includes: a radiation absorbing layer configured to convert photons incident on the radiation absorbing layer into an electrical signal; a plurality of comparators configured to compare the electrical signal with a plurality of reference values in order to sort the photons according to a plurality of energy bands; and a plurality of counters configured to count and store a number of a plurality of photons that are sorted according to the plurality of energy bands, wherein at least one from among the plurality of reference values in a first counting pixel included in the image pixel is different from at least another from among the plurality of reference values in a second counting pixel included in the image pixel.

The radiation detecting apparatus may further include an input/output (I/O) device configured to output a user interface screen that enables a user to set the plurality of reference values.

The radiation detecting apparatus may further include a power supplier configured to generate a plurality of voltages respectively corresponding to the plurality of reference values that are input via the user interface screen and apply the plurality of voltages to the plurality of comparators.

The radiation detecting apparatus may further include a digital-to-analog converter (DAC) configured to generate current corresponding to the plurality of reference values that are input via the user interface screen and supply the current to the plurality of comparators.

At least one of the plurality of reference values that are used in the first counting pixel may be the same as at least one of the plurality of reference values that are used in the second counting pixel.

A reference value that is used to sort a low energy band from among the plurality of reference values that are used in the first counting pixel may be the same as a reference value that is used to sort a low energy band from among the plurality of reference values that are used in the second counting pixel.

The first counting pixel may be disposed adjacent to the second counting pixel.

Each of the plurality of counting pixels may have a size equal to or less than 1 mm$^2$.

Sizes of the plurality of counters may respectively vary according to the plurality of reference values.

The plurality of comparators may include: a first comparator configured to compare the first electrical signal with a first reference value among the plurality of reference values; a second comparator configured to compare the first electrical signal with a second reference value among the plurality of reference values; and a third comparator configured to compare the first electrical signal with a third reference value among the plurality of reference values, wherein at least one of the first, second and third reference values that are used in the first counting pixel is different by a predetermined offset from at least one of the first, second and third reference values that are used in the second counting pixel.

The radiation detecting apparatus may further include an I/O device configured to output a user interface screen that enables a user to set at least one of the first, second and third reference values that are used in the first counting pixel, the first, second and third reference values that are used in the second counting pixel, and the predetermined offset.

According to another aspect of an exemplary embodiment, there is provided a tomography imaging apparatus including a radiation detector, wherein the radiation detector includes a plurality of image pixels each including at least one counting pixel and configured to restore an image, wherein the at least one counting pixel includes: a radiation absorbing layer configured to convert photons incident on the radiation absorbing layer into an electrical signal; a plurality of comparators configured to compare the electrical signal with a plurality of reference values in order to sort the photons according to a plurality of energy bands; and a plurality of counters configured to count and store a number of a plurality of photons that are sorted according to the plurality of energy bands, wherein at least one from among the plurality of reference values in a first counting pixel included in the image pixel is different from at least another from among the plurality of reference values in a second counting pixel included in the image pixel.

According to another aspect of an exemplary embodiment, there is provided a tomography imaging apparatus including: a radiation detector including a plurality of pixels configured to detect radiation including photons; and an image processor configured to reconstruct a CT image based on a quantity of the photons detected by the radiation detector, wherein at least one of the plurality of pixels includes: a radiation absorbing layer configured to convert the photons incident on the radiation absorbing layer into a first electrical signal; and a photon processor including a plurality of storages configured to count and store a number of the photons based on the first electrical signal, wherein at least one of the plurality of storages is configured to compare the first electrical signal with a first reference value to obtain a second electrical signal, and count and store the number of the photons based on a third electrical signal that is obtained based on a comparison of the second electrical signal with a second reference value.

According to another aspect of an exemplary embodiment, there is provided an X-ray imaging apparatus including a radiation detector, wherein the radiation detector includes a plurality of image pixels each including at least one counting pixel and configured to restore an image, wherein the counting pixel includes: a radiation absorbing layer configured to convert photons incident on the radiation absorbing layer into an electrical signal; a plurality of comparators configured to compare the electrical signal with a plurality of reference values in order to sort the photons according to a plurality of energy bands; and a plurality of counters configured to count and store a number of a plurality of photons that are sorted according to the plurality of energy bands; wherein at least one from among the plurality of reference values in a first counting pixel included in the image pixel is different from at least another from among the plurality of reference values in a second counting pixel included in the image pixel.

An X-ray imaging apparatus according to exemplary embodiments includes a radiation detector that includes a plurality of unit detectors. Each of the unit detectors includes: a radiation absorbing layer that converts an incident photon into a first electrical signal; a plurality of comparators that compare the first electrical signal and a plurality of reference values to classify the photon into a plurality of energy bands; and a plurality of counters that count and store a number of a plurality of the photons classified into the plurality of energy bands, wherein at least one of the plurality of reference values, which are used in a first unit detector of the plurality of units detectors, differs from at least one of the plurality of reference values which are used in a second unit detector of the plurality of units detectors.

BRIEF DESCRIPTION OF THE DRAWINGS

These and/or other aspects will become apparent and more readily appreciated from the following description of the exemplary embodiments, taken in conjunction with the accompanying drawings in which:

FIG. 5B is a table for explaining spectrum modeling;

FIG. 7C is a diagram illustrating a radiation detector according to another exemplary embodiment;

DETAILED DESCRIPTION

Figure 1A:
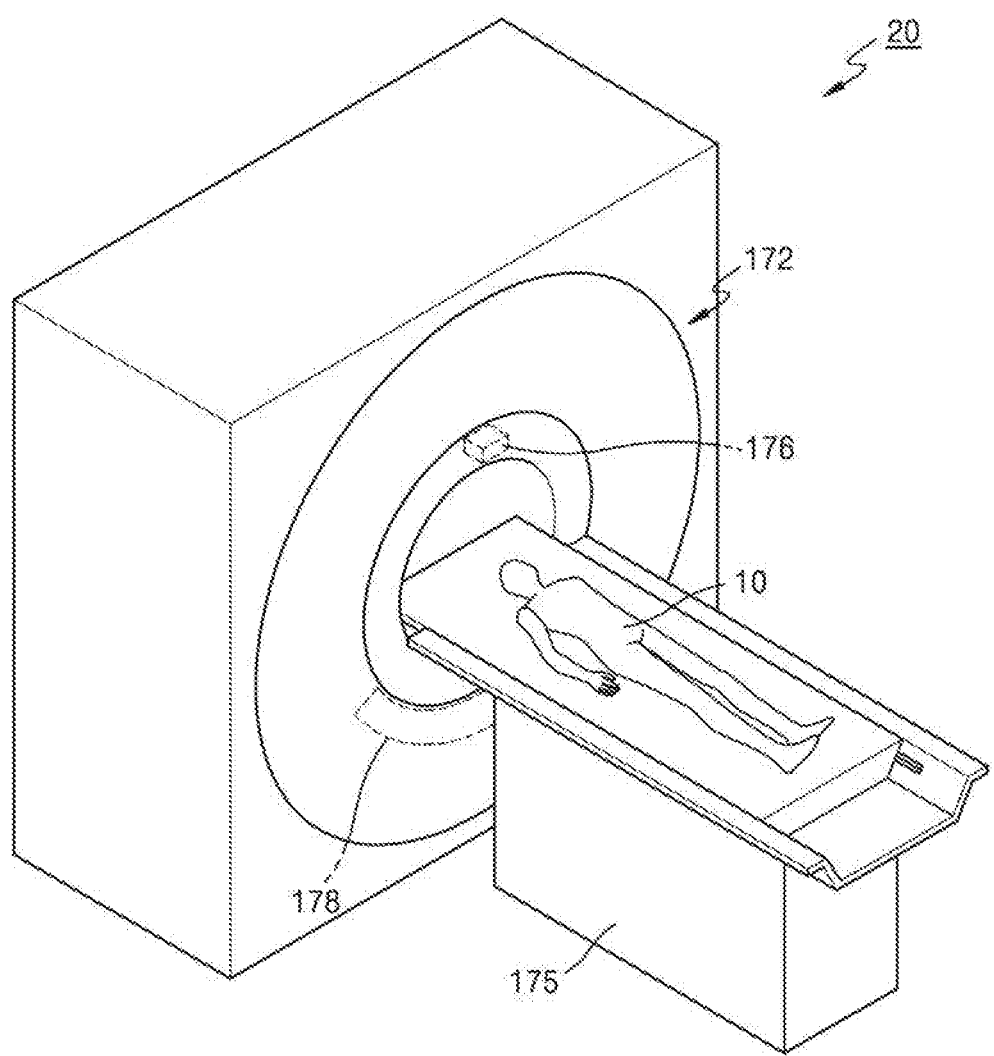
FIG. 1A is a perspective view illustrating a computed tomography (CT) system according to an exemplary embodiment.

The attached drawings for illustrating exemplary embodiments of the present invention are referred to in order to gain a sufficient understanding of the present invention, the merits thereof, and the objectives accomplished by the implementation of the present invention. The invention may, however, be embodied in many different forms and should not be construed as being limited to the embodiments set forth herein; rather, these embodiments are provided such that this disclosure will be thorough and complete, and will fully convey the concept of the invention to one of ordinary skill in the art. Like reference numerals refer to like elements throughout the specification.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the present specification. Thus, the terms used in the specification should be understood not as simple names but based on the meaning of the terms and the overall description of the invention.

When a part "includes" or "comprises" an element, unless there is a particular description contrary thereto, the part can further include other elements, not excluding the other elements. Also, the term "unit" in the embodiments of the present invention means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Reference will now be made in detail to embodiments, examples of which are illustrated in the accompanying drawings. In this regard, the present embodiments may have different forms and should not be construed as being limited to the descriptions set forth herein. In the following description, well-known functions or constructions are not described in detail so as not to obscure the embodiments with unnecessary detail.

Throughout the specification, an "image" may mean multi-dimensional data formed of discrete image elements, e.g., pixels in a two-dimensional (2D) image and voxels in a three-dimensional (3D) image. For example, the image may include a medical image of an object which is captured by a computed tomography (CT) imaging apparatus.

Throughout the specification, a "tomography image" may be an image generated by performing CT on an object by using a CT imaging apparatus or a CT system, that is, generated by irradiating rays such as X-rays to the object and gathering reflected data. Throughout the specification, a "CT image" may mean an image generated by synthesizing a plurality of X-ray images that are obtained by photographing an object while a CT imaging apparatus rotates around at least one axis with respect to the object.

Throughout the specification, an "object" may be a human, an animal, or a portion of a human or animal. For example, the object may be an organ (e.g., the liver, the heart, the womb, the brain, a breast, or the abdomen), a blood vessel, or a combination thereof. The object may be a phantom. The phantom means a material having a density, an effective atomic number, and a volume that are approximately the same as those of an organism. For example, the phantom may be a spherical phantom having properties similar to the physical body.

Throughout the specification, a "user" may be, but is not limited to, a medical expert including a medical doctor, a nurse, a medical laboratory technologist, a medial image expert, or a technician who repairs a medical apparatus.

Since a tomography imaging system such as a CT system is capable of providing a cross-sectional image of an object, the CT system may distinctively express an inner structure, e.g., an organ such as a kidney or a lung, of the object, compared to a general X-ray imaging apparatus.

In detail, examples of a tomography imaging system may include a CT imaging apparatus, an optical coherence tomography (OCT) imaging apparatus, a positron emission tomography (PET)-CT imaging apparatus, and a single photon emission computed tomography (SPECT) imaging apparatus.

The following will be explained on the assumption that a CT system is used as a tomography imaging system for obtaining a tomography image.

The CT system may obtain a plurality of pieces of image data with a thickness not more than 2 mm several tens to several hundred times per second and then may process the plurality of pieces of image data, so that the CT system may provide a relatively accurate cross-sectional image of the object. According to the related art, only a horizontal cross-sectional image of the object can be obtained, but this issue has been overcome due to various image reconstruction methods. Examples of 3D image reconstruction methods are as below:

Shade surface display (SSD)—an initial 3D imaging method of displaying only voxels having a predetermined Hounsfield Units (HU) value.

Maximum intensity projection (MIP)/minimum intensity projection (MinIP)—a 3D imaging method of displaying only voxels having the greatest or smallest HU value from among voxels that construct an image.

Volume rendering (VR)—an imaging method capable of adjusting a color and transmittance of voxels that constitute an image, according to areas of interest.

Virtual endoscopy—a method that allows endoscopy observation in a 3D image that is reconstructed by using the VR method or the SSD method.

Multi-planar reformation (MPR)—a method of reconstructing an image into a different cross-sectional image. A user may reconstruct an image in any desired direction.

Editing—a method of editing adjacent voxels so as to allow a user to easily observe an area of interest in volume rendering.

Voxel of interest (VOI)—a method of displaying only a selected area in volume rendering.

A CT system 20 according to an embodiment of the present invention will now be described with reference to FIGS. 1A and 1B. The CT system 20 may include various types of devices.

FIG. 1A schematically illustrates a CT system 20. Referring to FIG. 1A, the CT system 20 may include a gantry 172, a table 175, an X-ray generating unit 176 (e.g., X-ray generator), and an X-ray detecting unit 178 (also referred to as an X-ray detector).

The gantry 172 may include the X-ray generating unit 176 and the X-ray detecting unit 178.

An object 10 may be positioned on the table 175.

The table 175 may move in a predetermined direction (e.g., at least one of up, down, right, and left directions) during a CT imaging procedure. Also, the table 175 may tilt or rotate by a predetermined angle in a predetermined direction.

The gantry 172 may also tilt by a predetermined angle in a predetermined direction.

Figure 1B:
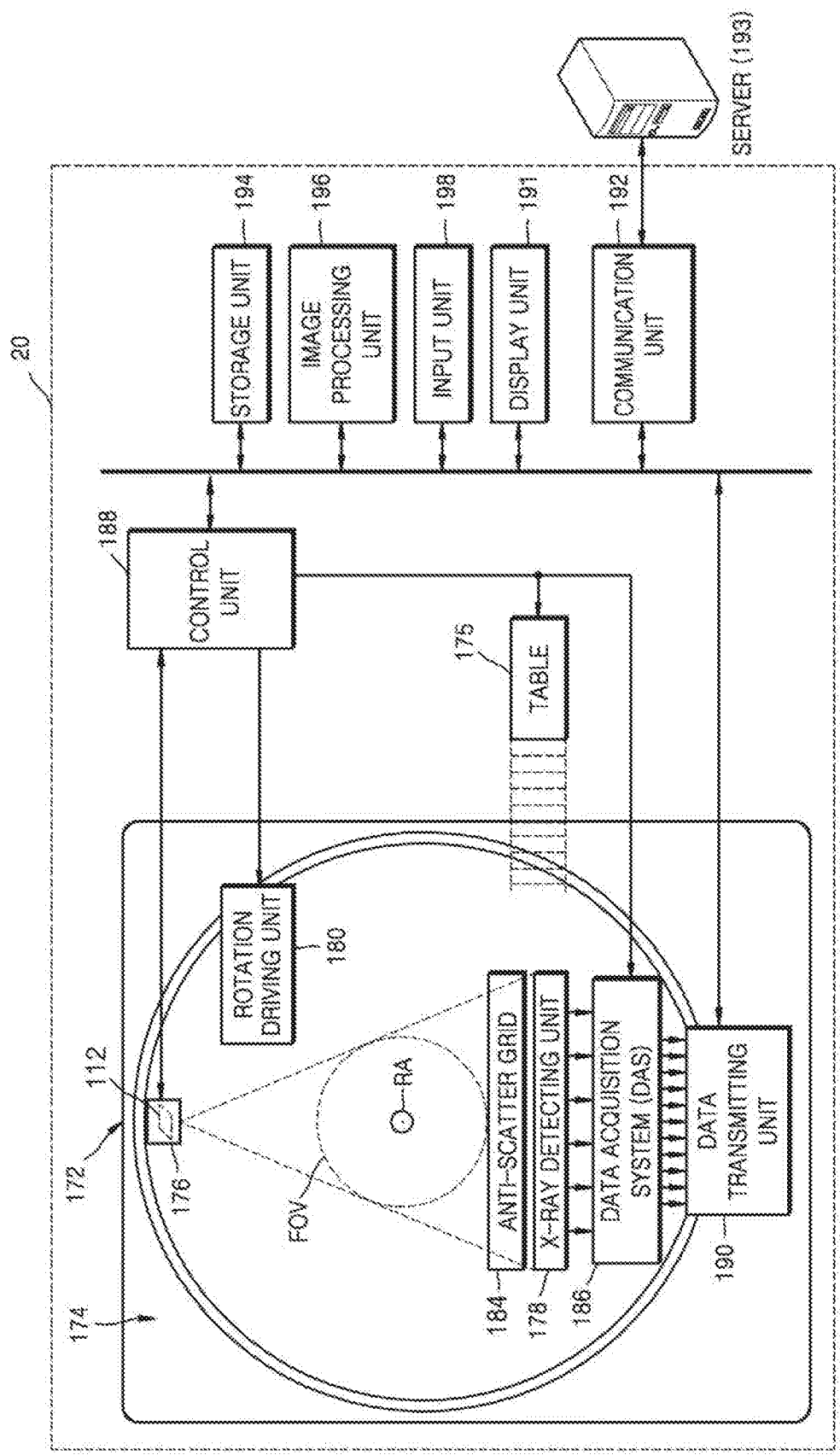
FIG. 1B is a block diagram illustrating a structure of the CT system of FIG. 1A.

FIG. 1B is a block diagram illustrating a structure of the CT system 20.

The CT system 20 may include the gantry 172, the table 175, a control unit 188, a storage unit 194 (e.g., storage), an image processing unit 196 (e.g., image processor), an input unit 198 (e.g., inputter), a display unit 191 (e.g., display), and a communication unit 192 (also referred to as a communicator).

As described above, the object 10 may be positioned on the table 175. In the present embodiment, the table 175 may move in a predetermined direction (e.g., at least one of up, down, right, and left directions), and movement of the table 105 may be controlled by the control unit 188.

The gantry 172 may include a rotating frame 174, the X-ray generating unit 176, the X-ray detecting unit 178 (e.g., X-ray detector), a rotation driving unit 180 (e.g., rotation driver), a data acquisition system (DAS) 186, and a data transmitting unit 190 (e.g., data transmitter).

The gantry 172 may include the rotating frame 174 having a loop shape capable of rotating with respect to a predetermined rotation axis RA. Also, the rotating frame 174 may have a disc shape.

The rotating frame 174 may include the X-ray generating unit 176 and the X-ray detecting unit 178 that are arranged to face each other so as to have predetermined fields of view FOV. The rotating frame 174 may also include an anti-scatter grid 184. The anti-scatter grid 184 may be positioned between the X-ray generating unit 176 and the X-ray detecting unit 178.

In a medical imaging system, X-ray radiation that reaches a detector (or a photosensitive film) includes not only attenuated primary radiation that forms a valuable image but also scattered radiation that deteriorates the quality of an image. In order to transmit most of the primary radiation and to attenuate the scattered radiation, the anti-scatter grid 184 may be positioned between a patient and the detector (or the photosensitive film).

For example, the anti-scatter grid 184 may be formed by alternately stacking lead foil strips and an interspace material such as a solid polymer material, solid polymer, or a fiber composite material. However, formation of the anti-scatter grid 184 is not limited thereto.

The rotating frame 174 may receive a driving signal from the rotation driving unit 180 and may rotate the X-ray generating unit 176 and the X-ray detecting unit 178 at a predetermined rotation speed. The rotating frame 174 may receive the driving signal and power from the rotation driving unit 180 while the rotating frame 174 contacts the rotation driving unit 180 via a slip ring (not shown). Also, the rotating frame 174 may receive the driving signal and power from the rotation driving unit 180 via wireless communication.

The X-ray generating unit 176 may receive a voltage and current from a power distribution unit (PDU) (e.g., power distributor) (not shown) via a slip ring (not shown) and then a high voltage generating unit (e.g., high voltage generator) (not shown), and may generate and emit an X-ray. When the high voltage generating unit applies predetermined voltage (hereinafter, referred to as a tube voltage) to the X-ray generating unit 176, the X-ray generating unit 176 may generate X-rays having a plurality of energy spectra that correspond to the tube voltage.

The X-ray generated by the X-ray generating unit 176 may be emitted in a predetermined form due to a collimator 182.

The X-ray detecting unit 178 may be positioned to face the X-ray generating unit 176. The X-ray detecting unit 178 may be positioned to face the X-ray generating unit 176. Each of the plurality of X-ray detecting devices may establish one channel but one or more embodiments of the present invention are not limited thereto.

The X-ray detecting unit 178 may detect the X-ray that is generated by the X-ray generating unit 176 and that is transmitted through the object 10, and may generate an electrical signal corresponding to intensity of the detected X-ray.

The X-ray detecting unit 178 may include an indirect-type X-ray detector for detecting radiation after converting the radiation into light, and a direct-type X-ray detector for detecting radiation after directly converting the radiation into electric charges. The indirect-type X-ray detector may use a scintillator. Also, the direct-type X-ray detector may use a photon counting detector. The DAS 186 may be connected to the X-ray detecting unit 178. Electrical signals generated by the X-ray detecting unit 178 may be acquired by the DAS 186. Electrical signals generated by the X-ray detecting unit 178 may be acquired by wire or wirelessly by the DAS 186. Also, the electrical signals generated by the X-ray detecting unit 178 may be provided to an analog-to-digital converter (not shown) via an amplifier (not shown).

According to a slice thickness or the number of slices, only some of a plurality of pieces of data collected by the X-ray detecting unit 178 may be provided to the image processing unit 196 via the data transmitting unit 120, or the image processing unit 196 may select only some of the plurality of pieces of data.

Such a digital signal may be provided to the image processing unit 196 via the data transmitting unit 190. The digital signal may be provided to the image processing unit 196 by wire or wirelessly via the data transmitting unit 190.

The control unit 188 may control an operation of each of the elements in the CT system 20. For example, the control unit 188 may control operations of the table 175, the rotation driving unit 180, the collimator 182, the DAS 186, the storage unit 194, the image processing unit 196, the input unit 198, the display unit 191, the communication unit 192, or the like.

The image processing unit 196 may receive data acquired by the DAS 186 (e.g., raw data that is data before processing), via the data transmitting unit 190, and may perform pre-processing.

The pre-processing may include, for example, a process of correcting a sensitivity irregularity between channels and a process of correcting signal loss due to a rapid decrease in signal strength or due to the presence of an X-ray absorbing material such as metal.

Data output from the image processing unit 196 may be referred to as raw data or projection data. The projection data may be stored in the storage unit 194 with imaging conditions (e.g., the tube voltage, an imaging angle, etc.) during the acquisition of data.

The projection data may be a group of data values that correspond to the intensity of the X-ray that has passed through the object 10. For convenience of description, a group of a plurality of pieces of projection data that are simultaneously obtained from all channels at the same imaging angle is referred to as a projection data set.

The storage unit 194 may include at least one storage medium from among a flash memory-type storage medium, a hard disk-type storage medium, a multimedia card micro-type storage medium, card-type memories (e.g., an SD card, an XD memory, and the like), random access memory (RAM), static random access memory (SRAM), read-only memory (ROM), electrically erasable programmable ROM (EEPROM), programmable ROM (PROM), magnetic memory, a magnetic disc, and an optical disc.

The image processing unit 196 may reconstruct a cross-sectional image of the object 10 by using the acquired projection data set. The cross-sectional image may be a 3D image. In other words, the image processing unit 196 may reconstruct a 3D image of the object 10 by using a cone beam reconstruction method or the like, based on the acquired projection data set.

The input unit 198 may receive an external input with respect to an X-ray tomography imaging condition, an image processing condition, or the like. For example, the X-ray tomography imaging condition may include tube voltages, an energy value setting with respect to a plurality of X-rays, a selection of an imaging protocol, a selection of an image reconstruction method, a setting of a FOV area, the number of slices, a slice thickness, a parameter setting with respect to image post-processing, or the like. Also, the image processing condition may include a resolution of an image, an attenuation coefficient setting for the image, setting for an image combining ratio, or the like.

The input unit 198 may include a device for receiving a predetermined input from an external source For example, the input unit 198 may include a microphone, a keyboard, a mouse, a joystick, a touch pad, a touch pen, a voice recognition device, a gesture recognition device, or the like.

The display unit 191 may display an X-ray image reconstructed by the image processing unit 196.

Exchanges of data, power, or the like between the aforementioned elements may be performed by using at least one of wired communication, wireless communication, and optical communication.

The communication unit 192 may perform communication with an external device, an external medical apparatus, etc. via a server 193 or the like. The communication will now be described with reference to FIG. 2.

Figure 2:
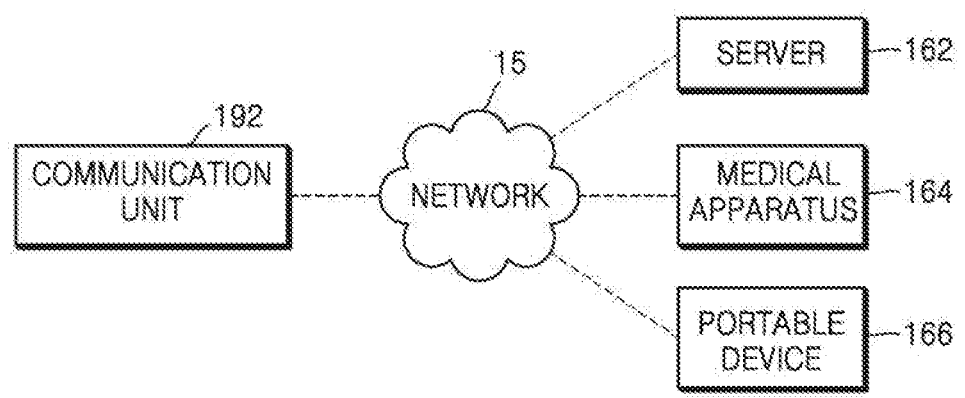
FIG. 2 is a block diagram illustrating a structure of a communication unit.

FIG. 2 is a block diagram illustrating the communication performed by the communication unit 132.

The communication unit 192 may be connected to a network 15 by wire or wirelessly and therefore may perform communication with the server 193, a medical apparatus 164, or a portable device 166. The communication unit 192 may exchange data with a hospital server or another medical apparatus in a hospital, which is connected thereto via a PACS.

Also, the communication unit 192 may perform data communication with the portable device 166 or the like, according to the digital imaging and communications in medicine (DICOM) standard.

The communication unit 192 may transmit and receive data related to diagnosing the object 10, via the network 15. Also, the communication unit 192 may transmit and receive a medical image obtained from the medical apparatus 164 such as a magnetic resonance imaging (MRI) apparatus, an X-ray apparatus, or the like.

Furthermore, the communication unit 192 may receive a diagnosis history or a medical treatment schedule about a patient from the server 193 and may use the diagnosis history or the medical treatment schedule to diagnose the patient. Also, the communication unit 192 may perform data communication not only with the server 193 or the medical apparatus 164 in a hospital but also with the portable device 166 of a user or patient.

Also, the communication unit 132 may transmit information about a device error, information about a quality control status, or the like to a system manager or a service manager via a network 301, and may receive a feedback regarding the information from the system manager or service manager.

Figure 3A:
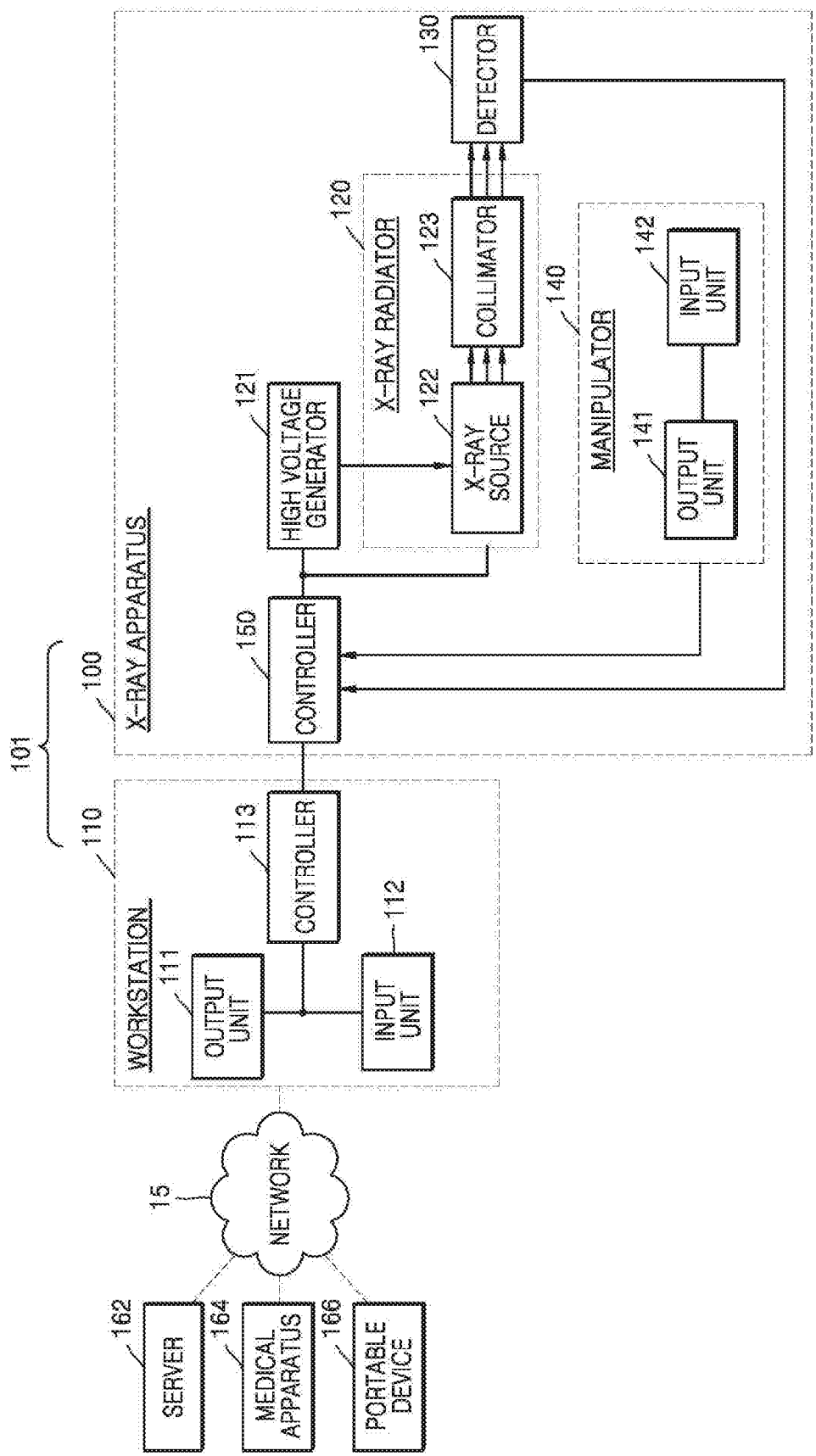
FIG. 3A is a block diagram illustrating a structure of an X-ray system.

FIG. 3A is a block diagram of an X-ray system 101.

Referring to FIG. 3A, the X-ray system 101 includes an X-ray apparatus 100 and a workstation 110. The X-ray apparatus 100 shown in FIG. 3A may be a fixed-type X-ray apparatus or a mobile X-ray apparatus. The X-ray apparatus 100 may include an X-ray radiator 120, a high voltage generator 121, a detector 130, a manipulator 140, and a controller 150. The controller 150 may control overall operations of the X-ray apparatus 100.

The high voltage generator 121 generates a high voltage for generating X-rays, and applies the high voltage to an X-ray source 122.

The X-ray radiator 120 includes the X-ray source 122 receiving the high voltage from the high voltage generator 121 to generate and radiate X-rays, and a collimator 123 for guiding a path of the X-ray radiated from the X-ray source 122 and adjusting an irradiation region radiated by the X-ray.

The X-ray source 122 includes an X-ray tube that may be realized as a vacuum tube diode including a cathode and an anode. An inside of the X-ray tube is set as a high vacuum state of about 10 mmHg, and a filament of the anode is heated to a high temperature to generate thermal electrons. The filament may be a tungsten filament, and a voltage of about 10V and a current of about 3 to 5 A may be applied to an electric wire connected to the filament to heat the filament.

In addition, when a high voltage of about 10 to about 300 kVp is applied between the cathode and the anode, the thermal electrons are accelerated to collide with a target material of the cathode, and then, an X-ray is generated. The X-ray is radiated outside via a window, and the window may be formed of a beryllium thin film. In this case, most of the energy of the electrons colliding with the target material is consumed as heat, and remaining energy is converted into the X-ray.

The cathode is mainly formed of copper, and the target material is disposed opposite to the anode. The target material may be a high resistive material such as chromium (Cr), iron (Fe), cobalt (Co), nickel (Ni), tungsten (W), or molybdenum (Mo). The target material may be rotated by a rotating field. When the target material is rotated, an electron impact area is increased, and a heat accumulation rate per unit area may be increased to be at least ten times greater than that of a case where the target material is fixed.

The voltage applied between the cathode and the anode of the X-ray tube is referred to as a tube voltage, and the tube voltage is applied from the high voltage generator 121 and a magnitude of the tube voltage may be expressed by a crest value (kVp). When the tube voltage increases, a velocity of the thermal electrons increases, and accordingly, an energy of the X-ray (energy of photon) that is generated when the thermal electrons collide with the target material is increased. The current flowing in the X-ray tube is referred to as a tube current that may be expressed as an average value (mA). When the tube current increases, the number of thermal electrons emitted from the filament is increased, and accordingly, the X-ray dose (the number of X-ray photons) generated when the thermal electrons collide with the target material is increased.

Therefore, the energy of the X-ray may be adjusted according to the tube voltage, and the intensity of the X-ray or the X-ray dose may be adjusted according to the tube current and the X-ray exposure time.

The detector 130 detects an X-ray that is radiated from the X-ray radiator 120 and has been transmitted through an object. The detector 130 may be a digital detector. The detector 130 may be implemented by using a thin film transistor (TFT) or a charge coupled device (CCD). Although the detector 130 is included in the X-ray apparatus 100 in FIG. 3A, the detector 130 may be an X-ray detector that is a separate device capable of being connected to or separated from the X-ray apparatus 100.

The X-ray apparatus 100 may further include a manipulator 140 for providing a user with an interface for manipulating the X-ray apparatus 100. The manipulator 140 may include an output unit 141 and an input unit 142. The input unit 142 may receive from a user a command for manipulating the X-ray apparatus 100 and various types of information related to X-ray photographing. The controller 150 may control or manipulate the X-ray apparatus 100 according to the information received by the input unit 142. The output unit 141 may output sound representing information related to a photographing operation such as the X-ray radiation under the control of the controller 150.

The workstation 110 and the X-ray apparatus 100 may be connected to each other by wire or wirelessly. When they are connected to each other wirelessly, a device (not shown) for synchronizing clock signals with each other may be further included. The workstation 110 and the X-ray apparatus 100 may exist within physically separate spaces.

The workstation 110 may include an output unit 111, an input unit 112, and a controller 113. The output unit 111 and the input unit 112 provide a user with an interface for manipulating the workstation 110 and the X-ray apparatus 200. The controller 113 may control the workstation 110 and the X-ray apparatus 200.

The X-ray apparatus 100 may be controlled via the workstation 110 or may be controlled by the controller 150 included in the X-ray apparatus 100. Accordingly, a user may control the X-ray apparatus 100 via the workstation 110 or may control the X-ray apparatus 100 via the manipulator 140 and the controller 150 included in the X-ray apparatus 100. In other words, a user may remotely control the X-ray apparatus 100 via the workstation 110 or may directly control the X-ray apparatus 100.

Although the controller 113 of the workstation 110 is separate from the controller 150 of the X-ray apparatus 100 in FIG. 3A, FIG. 3A is only an example. In some embodiments, the controllers 113 and 150 may be integrated into a single controller, and the single controller may be included in only one of the workstation 110 and the X-ray apparatus 100. Hereinafter, the controllers 113 and 150 may denote the controller 113 of the workstation 110 and/or the controller 150 of the X-ray apparatus 100.

The output unit 111 and the input unit 112 of the workstation 110 may provide a user with an interface for manipulating the X-ray apparatus 100, and the output unit 141 and the input unit 142 of the X-ray apparatus 100 may also provide a user with an interface for manipulating the X-ray apparatus 100. Although the workstation 110 and the X-ray radiation apparatus 100 include the output units 111 and 141, respectively, and the input units 112 and 142, respectively, in FIG. 3A, embodiments are not limited thereto. Only one of the workstation 110 and the X-ray apparatus 100 may include an output unit or an input unit.

Hereinafter, the input units 112 and 142 may denote the input unit 112 of the workstation 110 and/or the input unit 142 of the X-ray apparatus 100, and the output units 111 and 141 may denote the output unit 111 of the workstation 110 and/or the output unit 141 of the X-ray apparatus 100.

Examples of the input units 112 and 142 may include a keyboard, a mouse, a touch screen, a voice recognizer, a fingerprint recognizer, an iris recognizer, and other input devices which are well known to one of ordinary skill in the art. The user may input a command for radiating the X-ray via the input units 112 and 142, and the input units 112 and 142 may include a switch for inputting the command. The switch may be configured so that a radiation command for radiating the X-ray may be input only when the switch is pushed in two steps.

In other words, when the user pushes the switch, a prepare command for performing a pre-heating operation for X-ray radiation may be input, and in this state, when the user pushes the switch deeper, a radiation command for performing substantial X-ray radiation may be input. When the user manipulates the switch as described above, the controllers 113 and 150 generate signals corresponding to the commands input through the switch manipulation, that is, a prepare signal, and transmit the generated signals to the high voltage generator 121 generating a high voltage for generating the X-ray.

When the high voltage generator 121 receives the prepare signal from the controllers 113 and 150, the high voltage generator 121 starts a pre-heating operation, and when the pre-heating is finished, the high voltage generator 121 outputs a ready signal to the controllers 113 and 150. In addition, the detector 130 also needs to prepare to detect the X-ray, and thus the high voltage generator 121 performs the pre-heating operation and the controllers 113 and 150 transmit a prepare signal to the detector 130 so that the detector 130 may prepare to detect the X-ray transmitted through the object. The detector 130 prepares to detect the X-ray in response to the prepare signal, and when the preparing for the detection is finished, the detector 130 outputs a ready signal to the controllers 113 and 150.

When the pre-heating operation of the high voltage generator 121 is finished and the detector 130 is ready to detect the X-ray, the controllers 113 and 150 transmit a radiation signal to the high voltage generator 121, the high voltage generator 121 generates and applies the high voltage to the X-ray source 122, and the X-ray source 122 radiates the X-ray.

When the controllers 113 and 150 transmit the radiation signal to the high voltage generator 121, the controllers 113 and 150 may transmit a sound output signal to the output units 111 and 141 so that the output units 111 and 141 output a predetermined sound and the object may recognize the radiation of the X-ray. The output units 111 and 141 may also output a sound representing information related to photographing in addition to the X-ray radiation. In FIG. 3A, the output unit 141 is included in the manipulator 140; however, the embodiments are not limited thereto, and the output unit 141 or a portion of the output unit 141 may be located elsewhere. For example, the output unit 141 may be located on a wall of an examination room in which the X-ray photographing of the object is performed.

The controllers 113 and 150 control locations of the X-ray radiator 120 and the detector 130, photographing timing, and photographing conditions, according to photographing conditions set by the user.

In more detail, the controllers 113 and 150 control the high voltage generator 121 and the detector 130 according to the command input via the input units 112 and 142 so as to control radiation timing of the X-ray, an intensity of the X-ray, and a region radiated by the X-ray. In addition, the control units 113 and 150 adjust the location of the detector 130 according to a predetermined photographing condition, and controls operation timing of the detector 130.

Furthermore, the controllers 113 and 150 generate a medical image of the object by using image data received via the detector 130. In detail, the controllers 113 and 150 may receive the image data from the detector 130, and then, generate the medical image of the object by removing noise from the image data and adjusting a dynamic range and interleaving of the image data.

The output units 111 and 141 may output the medical image generated by the controllers 113 and 150. The output units 111 and 141 may output information that is necessary for the user to manipulate the X-ray apparatus 100, for example, a user interface (UI), user information, or object information. Examples of the output units 111 and 141 may include a speaker, a printer, a cathode ray tube (CRT) display, a liquid crystal display (LCD), a plasma display panel (PDP), an organic light emitting diode (OLED) display, a field emission display (FED), a light emitting diode (LED) display, a vacuum fluorescent display (VFD), a digital light processing (DLP) display, a flat panel display (FPD), a three-dimensional (3D) display, a transparent display, and other various output devices well known to one of ordinary skill in the art.

The workstation 110 shown in FIG. 3A may further include a communicator (not shown) that may be connected to a server 162, a medical apparatus 164, and a portable device 166 via a network 15.

The communicator may be connected to the network 15 by wire or wirelessly to communicate with the server 162, the medical apparatus 164, or the portable device 166. The communicator may transmit or receive data related to diagnosis of the object via the network 15, and may also transmit or receive medical images captured by the medical apparatus 164, for example, a CT imaging apparatus, an MRI apparatus, or an X-ray apparatus. Moreover, the communicator may receive a medical history or treatment schedule of an object (e.g., a patient) from the server 162 to diagnose a disease of the object. Also, the communicator may perform data communication with the portable device 166 such as a mobile phone, a personal digital assistant (PDA), or a laptop computer of a medical doctor or a client, as well as the server 162 or the medical apparatus 164 in a hospital. The communicator may include one or more elements enabling communication with external apparatuses. For example, the communicator may include a local area communication module, a wired communication module, and a wireless communication module.

The local area communication module refers to a module for performing local area communication with an apparatus located within a predetermined distance. Examples of local area communication technology may include, but are not limited to, a wireless local area network (LAN), Wi-Fi, Bluetooth, ZigBee, Wi-Fi Direct (WFD), ultra wideband (UWD), infrared data association (IrDA), Bluetooth low energy (BLE), and near field communication (NFC).

The wired communication module refers to a module for communicating by using an electric signal or an optical signal. Examples of wired communication technology may include wired communication techniques using a pair cable, a coaxial cable, and an optical fiber cable, and other wired communication techniques that are well known to one of ordinary skill in the art.

The wireless communication module transmits and receives a wireless signal to and from at least one selected from a base station, an external apparatus, and a server in a mobile communication network. Here, examples of the wireless signal may include a voice call signal, a video call signal, and various types of data according to text/multimedia messages transmission.

The X-ray apparatus 100 shown in FIG. 3A may include a plurality of digital signal processors (DSPs), an ultra-small calculator, and a processing circuit for special purposes (for example, high speed analog/digital (ND) conversion, high speed Fourier transformation, and an array process).

In addition, communication between the workstation 110 and the X-ray apparatus 100 may be performed using a high speed digital interface, such as low voltage differential signalling (LVDS), asynchronous serial communication, such as a universal asynchronous receiver transmitter (UART), a low latency network protocol, such as error synchronous serial communication or a controller area network (CAN), or any of other various communication methods that are well known to one of ordinary skill in the art.

Figure 3B:
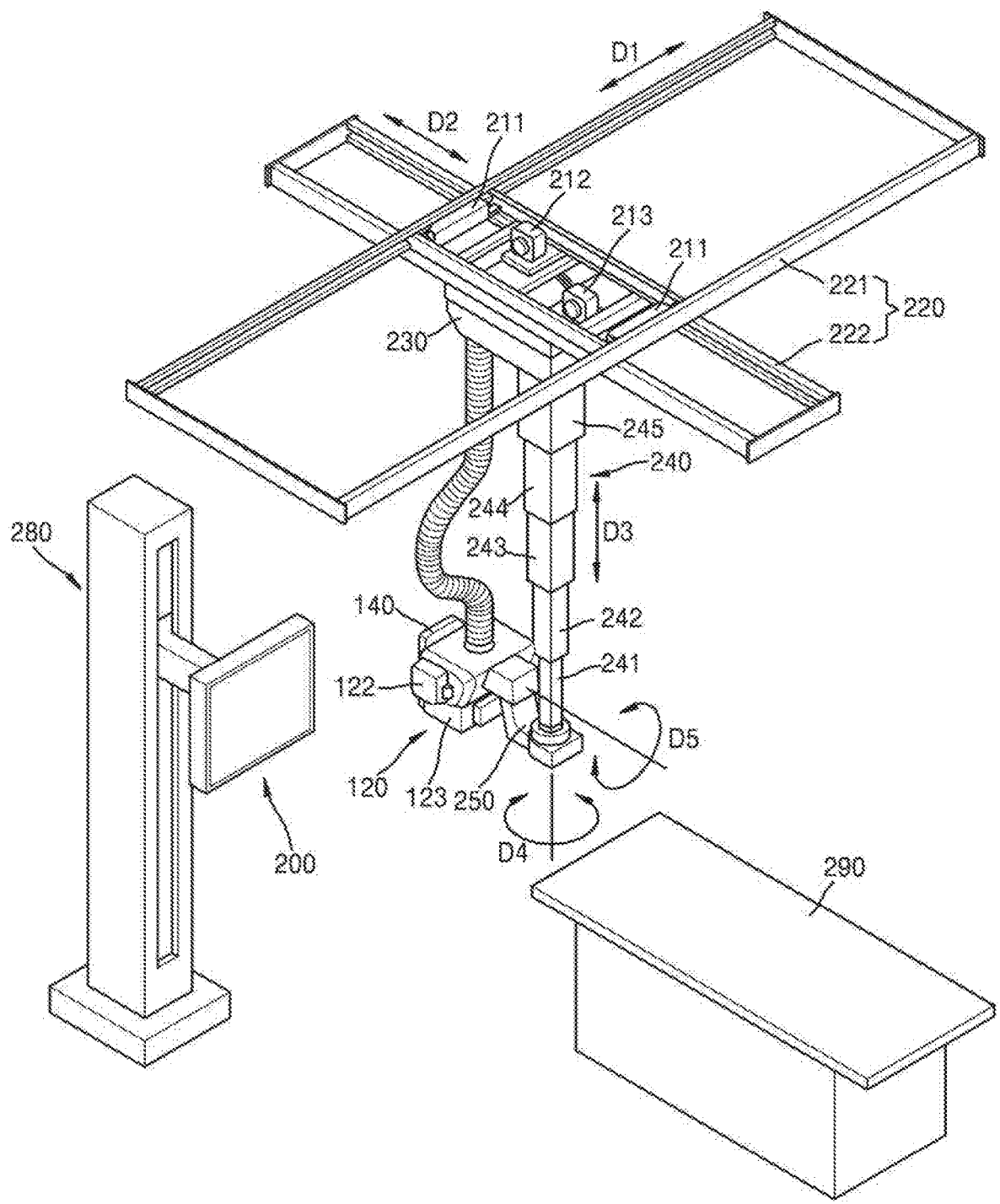
FIG. 3B is a perspective view illustrating a fixed type X-ray apparatus.

FIG. 3B is a perspective view of a fixed type X-ray apparatus 200. The mobile X-ray apparatus 200 may be another embodiment of the X-ray apparatus 100 of FIG. 3B. Components included in the mobile X-ray apparatus 200 that are the same as those of the X-ray apparatus 100 of FIG. 3A use the same reference numerals as those used in FIG. 3A, and a repeated description thereof will be omitted.

Referring to FIG. 3B, the fixed type X-ray apparatus 200 includes a manipulator 140 providing a user with an interface for manipulating the X-ray apparatus 200, an X-ray radiator 120 radiating an X-ray to an object, a detector 130 detecting an X-ray that has passed through the object, first, second, and third motors 211, 212, and 213 providing a driving power to transport the X-ray radiator 120, a guide rail 220, a moving carriage 230, and a post frame 240. The guide rail 220, the moving carriage 230, and the post frame 240 are formed to transport the X-ray radiator 120 by using the driving power of the first, second, and third motors 211, 212, and 213.

The guide rail 220 includes a first guide rail 221 and a second guide rail 222 that are provided to form a predetermined angle with respect to each other. The first guide rail 221 and the second guide rail 222 may respectively extend in directions crossing each other at 90°.

The first guide rail 221 is provided on the ceiling of an examination room in which the X-ray apparatus 200 is disposed.

The second guide rail 222 is located under the first guide rail 221, and is mounted so as to slide along the first guide rail 221. A roller (not shown) that may move along the first guide rail 221 may be provided on the first guide rail 221. The second guide rail 222 is connected to the roller to move along the first guide rail 221.

A first direction D1 is defined as a direction in which the first guide rail 221 extends, and a second direction D2 is defined as a direction in which the second guide rail 222 extends. Therefore, the first direction D1 and the second direction D2 cross each other at 90°, and may be parallel to the ceiling of the examination room.

The moving carriage 230 is disposed under the second guide rail 222 so as to move along the second guide rail 222. A roller (not shown) moving along the second guide rail 222 may be provided on the moving carriage 230.

Therefore, the moving carriage 230 may move in the first direction D1 together with the second guide rail 222, and may move in the second direction D2 along the second guide rail 222.

The post frame 240 is fixed on the moving carriage 230 and located under the moving carriage 230. The post frame 240 may include a plurality of posts 241, 242, 243, 244, and 245.

The plurality of posts 241, 242, 243, 244, and 245 are connected to each other to be foldable, and thus the post frame 240 may have a length that is adjustable in a vertical direction of the examination room while in a state of being fixed to the moving carriage 230.

A third direction D3 is defined as a direction in which the length of the post frame 240 increases or decreases. Therefore, the third direction D3 may be perpendicular to the first direction D1 and the second direction D2.

The detector 130 detects the X-ray that has passed through the object, and may be combined with a table type receptor 290 or a stand type receptor 280.

A rotating joint 250 is disposed between the X-ray radiator 120 and the post frame 240. The rotating joint 250 allows the X-ray radiator 120 to be coupled to the post frame 240, and supports a load applied to the X-ray radiator 120.

The X-ray radiator 120 connected to the rotating joint 250 may rotate on a plane that is perpendicular to the third direction D3. In this case, a rotating direction of the X-ray radiator 120 may be defined as a fourth direction D4.

Also, the X-ray radiator 120 may be configured to be rotatable on a plane perpendicular to the ceiling of the examination room. Therefore, the X-ray radiator 120 may rotate in a fifth direction D5 that is a rotating direction about an axis that is parallel with the first direction D1 or the second direction D2, with respect to the rotating joint 250.

The first, second, and third motors 211, 212, and 213 may be provided to move the X-ray radiator 120 in the first, second, and third directions D1, D2, and D3. The first, second, and third motors 211, 212, and 213 may be electrically driven, and the first, second, and third motors 211, 212, and 213 may respectively include an encoder.

The first, second, and third motors 211, 212, and 213 may be disposed at various locations in consideration of design convenience. For example, the first motor 211, moving the second guide rail 222 in the first direction D1, may be disposed around the first guide rail 221, the second motor 212, moving the moving carriage 230 in the second direction D2, may be disposed around the second guide rail 222, and the third motor 213, increasing or reducing the length of the post frame 240 in the third direction D3, may be disposed in the moving carriage 230. In another example, the first, second, and third motors 211, 212, and 213 may be connected to a driving power transfer unit (not shown) so as to linearly move the X-ray radiator 120 in the first, second, and third directions D1, D2, and D3. The driving power transfer unit may be a combination of a belt and a pulley, a combination of a chain and a sprocket, or a shaft, which are generally used.

In another example, motors (not shown) may be disposed between the rotating joint 250 and the post frame 240 and between the rotating joint 250 and the X-ray radiator 120 in order to rotate the X-ray radiator 120 in the fourth and fifth directions D4 and D5.

The manipulator 140 may be disposed on a side surface of the X-ray radiator 120.

Although FIG. 3B shows the fixed type X-ray apparatus 200 connected to the ceiling of the examination room, the fixed type X-ray apparatus 200 is merely an example for convenience of comprehension. That is, X-ray apparatuses according to embodiments of the present invention may include X-ray apparatuses having various structures that are well known to one of ordinary skill in the art, for example, a C-arm-type X-ray apparatus and an angiography X-ray apparatus, in addition to the fixed type X-ray apparatus 200 of FIG. 3B.

Figure 3C:
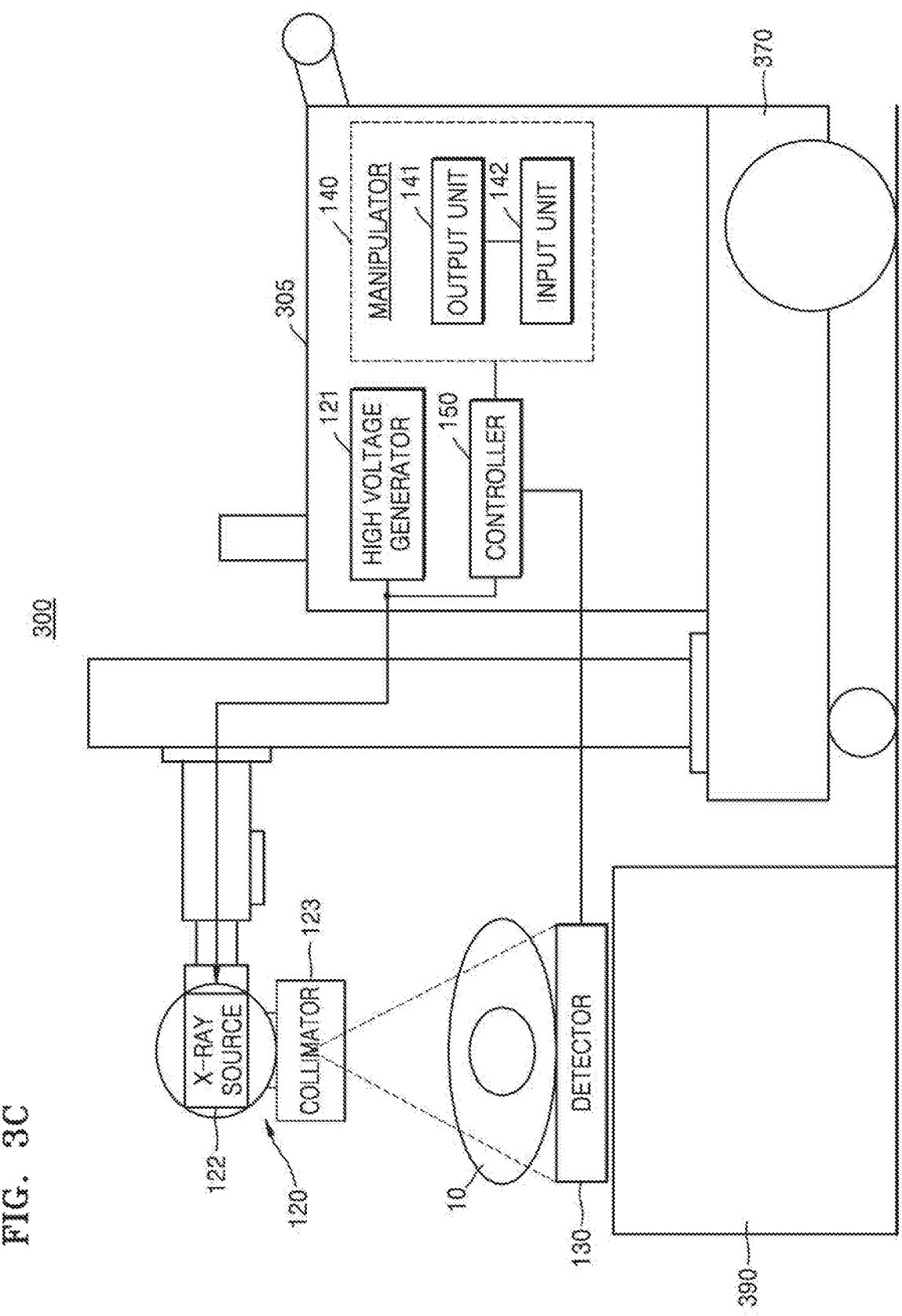
FIG. 3C is a diagram illustrating a mobile X-ray apparatus.

FIG. 3C is a diagram showing a configuration of a mobile X-ray apparatus 300 capable of performing an X-ray photographing operation regardless of a place where the photographing operation is performed. The mobile X-ray apparatus 300 may be another embodiment of the X-ray apparatus 100 of FIG. 3A. Components included in the mobile X-ray apparatus 300 that are the same as those of the X-ray apparatus 100 of FIG. 3A use the same reference numerals as those used in FIG. 3A, and a repeated description thereof will be omitted.

Referring to FIG. 3C, the mobile X-ray apparatus 300 includes a transport unit 370 including a wheel for transporting the mobile X-ray apparatus 300, a main unit 305, an X-ray radiator 120, and a detector 130 detecting an X-ray that is radiated from the X-ray radiator 120 toward an object and transmitted through the object. The main unit 305 includes a manipulator 140 providing a user with an interface for manipulating the mobile X-ray apparatus 300, a high voltage generator 121 generating a high voltage applied to an X-ray source 122, and a controller 150 controlling overall operations of the mobile X-ray apparatus 300. The X-ray radiator 120 includes the X-ray source 122 generating the X-ray, and a collimator 123 guiding a path along which the generated X-ray is emitted from the X-ray source 122 and adjusting an irradiation region radiated by the X-ray.

Although the detector 130 is combined with a table type receptor 390 in FIG. 3C, the detector 130 may be combined with a stand type receptor.

In FIG. 3C, the manipulator 140 is included in the main unit 305; however, embodiments are not limited thereto. For example, as illustrated in FIG. 3B, the manipulator 140 of the mobile X-ray apparatus 300 may be disposed on a side surface of the X-ray radiator 120.

A radiation detector according to an exemplary embodiment, which is a device for detecting radiation, detects incident radiation photons by using a direct method. The direct method means that incident radiation photons are directly converted into an electrical signal for counting. Accordingly, the radiation detector according to an exemplary embodiment may be applied to any of electronic devices for detecting radiation photons.

In detail, the radiation detector according to an exemplary embodiment may be applied to any of tomography imaging apparatuses such as a CT imaging apparatus, an optical coherence tomography (OCT) imaging apparatus, a position emission tomography (PET)-CT imaging apparatus, or a single photon emission computed tomography (SPECT) imaging apparatus.

In detail, the radiation detector according to an exemplary embodiment may correspond to an X-ray detector 178 of FIGS. 1A and 1B, and may be included in the CT system 20 of FIGS. 1A and 1B. In detail, the radiation detector according to an exemplary embodiment may be a radiation detector that is used to generate a tomography image. In detail, the radiation detector according to an exemplary embodiment may be a radiation detector that is used to generate a CT image. In detail, the radiation detector according to an exemplary embodiment may detect the radiation that is emitted from the X-ray generating unit 176, which is attached to the gantry 172 and rotates, and the radiation is transmitted through an object of FIGS. 1A and 1B.

Alternatively, the radiation detector according to an exemplary embodiment may correspond to the detector 130 of FIGS. 3A, 3B, and 3C, and may be included in the X-ray system 101 or the X-ray apparatus 100, 200, or 300 of FIGS. 3A, 3B, and 3C. In detail, the radiation detector according to an exemplary embodiment may be a radiation detector that is used to generate an X-ray image. In detail, the radiation detector according to an exemplary embodiment may detect the radiation that is emitted from an X-ray source, which is attached to a movable apparatus and allows its position to be adjusted, and the radiation is transmitted through an object. The movable apparatus to which the X-ray source is attached may include at least one of the guide rail 220, the moving carriage 230, and the post frame 240 of FIG. 3B. Also, the movable apparatus may include the transport unit 370 of FIG. 3C.

Alternatively, the radiation detector according to an exemplary embodiment may sort and detect incident radiation according to a plurality of energy bands. For example, the radiation detector according to an exemplary embodiment may be a radiation detector for obtaining a dual energy tomography image. Alternatively, the radiation detector according to an exemplary embodiment may be a radiation detector for obtaining a dual energy X-ray image.

The radiation detector according to an exemplary embodiment will now be explained in detail with reference to FIGS. 4 through 19.

Figure 4:
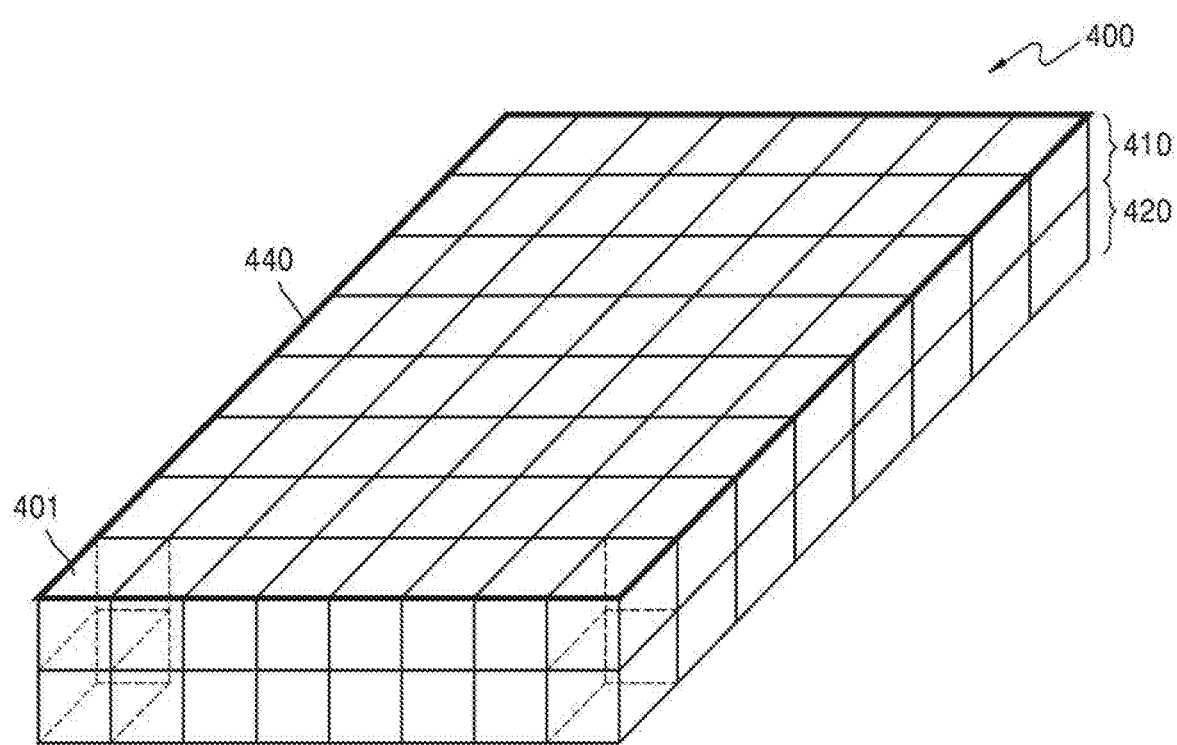
FIG. 4 is a view illustrating a radiation detector according to an exemplary embodiment.

FIG. 4 is a view illustrating a radiation detector 400 according to an exemplary embodiment.

The radiation detector 400 of FIG. 4 is a counting detector that detects radiation by using a direct method of directly converting incident radiation into electric charges. In detail, the radiation detector 400 is a photon counting detector that converts incident photons into an electrical signal and counts the number of photons by using the electrical signal. Also, the radiation detector 400 of FIG. 4 is a radiation detector for measuring multi-energy.

The radiation detector 400 for measuring multi-energy divides one photon into a plurality of bands according to energy magnitudes of the photon and restores a medical image by using the number of the photons that are sorted according to energy bands. In detail, the radiation detector 400 according to an exemplary embodiment may be a radiation detector for restoring a multi-energy radiation image. For example, the radiation detector 400 may be a radiation detector for obtaining a dual energy CT image or a duel energy X-ray image. Referring to FIG. 4, the radiation detector 400 includes a plurality of pixels 401 and 402 that detect radiation. According to an exemplary embodiment, the term "pixel" used herein may refer to a unit detector that detects radiation, and sorts and counts the radiation according to energy bands.

In detail, the radiation detector 400 may be a radiation detector that is used to generate a tomography image. For example, the radiation detector 400 may be an apparatus corresponding to the X-ray detecting unit 178 FIG. 1A. Alternatively, the radiation detector 400 may be an apparatus corresponding to the detector 130 of FIG. 3A, 3B, or 3C that is used to generate an X-ray image.

In detail, a radiation absorbing layer 410 may convert radiation photons into an electrical signal by using a direct method, and may include cadmium telluride (CdTe). CdTe is a semiconductor material. A photon processing unit (not shown) that is disposed on a rear surface 420 of the radiation absorbing layer 410 may also be formed of a semiconductor material. Also, the photon processing unit that is disposed on the rear surface 420 may be formed of CdTe, like the radiation absorbing layer 410, or any of other semiconductor materials.

Also, the term 'front surface' or 'rear surface' is a relative term, and a surface that is formed to face a radiation source for emitting radiation and receive the radiation is referred to as a front surface and the opposite surface that does not face the radiation source is referred to as a rear surface.

The plurality of pixels 401 and 402 may be arranged in a lattice form as shown in FIG. 4 and may have tetrahedral structures having the same size. In FIG. 4, a case where 64 pixels (8*8 pixels) are included in the radiation detector 400 is exemplarily shown.

In each of the plurality of pixels 401 and 402, a radiation absorbing layer 410 may be disposed in a front portion, and the photon processing unit may be disposed on a rear portion. In detail, the photon processing unit may include a plurality of comparators and at least one counter for counting photons that are incident on the radiation absorbing layer 410 and storing the number of the counted photons.

In detail, radiation that passes through an object is incident on a front surface 440 of the radiation detector 400 and is absorbed by the radiation absorbing layer 410 that is disposed on the front portion.

Also, the radiation absorbing layer 410 may be formed on at least one portion of a surface that faces an X-ray source. In detail, the radiation absorbing layer 410 may be formed on side surfaces of a front surface of the radiation detector 400 that faces the X-ray source, or at least a part of a rear surface of the radiation detector 400 on which X-rays of the X-ray source are likely to be incident due to scattering. A case where the radiation absorbing layer 400 is formed on the front surface of the radiation detector 400 that faces the X-ray source to have a uniform thickness is exemplarily illustrated in FIG. 4.

Figure 5A:
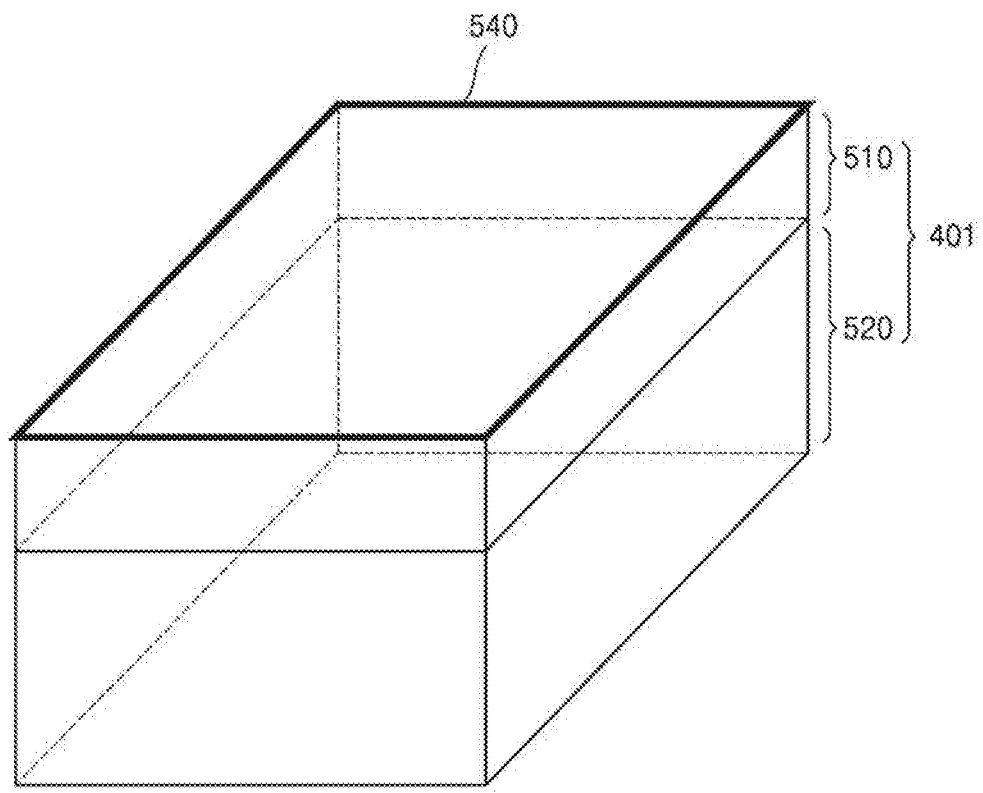
FIG. 5A is a view of one pixel of FIG. 4.

Also, although sub-pixels are arranged in a quadrangular lattice form in FIG. 5A, sub-pixels that are included in one pixel may have any of various shapes such as a honeycomb shape, a triangular shape, or a diamond shape. Also, the number of the sub-pixels that are included in one pixel may be 4*6=24, 5*5=25, 6*6=36, or others as described above.

Also, a front surface of one pixel (for example, the pixel 401) may have a size of about 1 mm*1 mm=1 mm$^2$. In detail, a length of one side of the one pixel 401 may range from 0.9 mm to 1.1 mm. According to an exemplary embodiment, a pixel size may be equal to or less than 1 mm$^2$, and thus an area of the front surface 440 of a pixel may be equal to or less than 1 mm$^2$.

FIG. 5A is a view of one pixel 540. The pixel 540 of FIG. 5A corresponds to one of the pixels 401 or 402 of FIG. 4. In detail, a radiation absorbing layer 510 that is disposed on the front surface of the pixel 540 and a rear portion 520 on which the photon processing unit is disposed respectively correspond to the radiation absorbing layer 410 and the rear surface 420 of FIG. 4, and thus a repeated explanation thereof will not be given here.

FIG. 5A is a view of one pixel 540. The pixel 540 of FIG. 5A corresponds to one of the pixels 401 or 402 of FIG. 4. In detail, a radiation absorbing layer 510 that is disposed on the front surface of the pixel 540 and a rear portion 520 on which the photon processing unit is disposed respectively correspond to the radiation absorbing layer 410 and the rear surface 420 of FIG. 4, and thus a repeated explanation thereof will not be given here.

Referring to FIG. 5A, one pixel 540 may include a plurality of sub-pixels. When the pixel 540 includes a plurality of sub-pixels, one unit detector for detecting and processing radiation may be a sub-pixel. The pixel 540 may include the radiation absorbing layer 510 which is disposed in a front portion, and a comparator and a counter for counting photons that are incident on the radiation absorbing layer 510 and storing the number of the counted photons, disposed in a rear portion 520.

For example, one pixel 540 may include 24 sub-pixels (4*6 sub-pixels), 25 sub-pixels (5*5 sub-pixels), or 36 sub-pixels (6*6 sub-pixels).

Under a photographing condition for a photon counting detector that is included in a high-class or high specification CT system, a tube voltage may be set to 120 kVp, tube current may be set to be equal to or greater than 200 mA, and a filter condition may be set to be about 5.6 mm of an aluminum equivalent thickness.

Under the photographing condition, the number of photons that should be absorbed and counted by one pixel 540 may be calculated according to X-ray spectrum modeling based on a tungsten anode spectral model using interpolating polynomials (TASMIP).

Under the photographing condition, the number of photons that should be absorbed and counted by one pixel 500 may be calculated according to X-ray spectrum modeling based on a tungsten anode spectral model using interpolating polynomials (TASMIP).

FIG. 5B is a table for explaining spectrum modeling.

The spectrum modeling may be designed to have values as shown in the table of FIG. 5B.

In the spectrum modeling, mean photon energy is 60.605 kilo electron volt (keV), and a 1$^{st}$ half value layer is 6.886 mm Al. Also, exposure is 7.739 mR/mAs when measuring is performed at a distance of about 1 m, and air Kerma is 67.799 uGy/mAs when measuring is performed at a distance of about 1 m. Under the modeling condition, fluence that passes through a unit area of 1 mm$^2$ and is incident is 2,004,955 photons/mm$^2$/mAs when measuring is performed at a distance of about 1 m.

According to a spectrum modeling, the number of photons that are generated when X-rays of 1 mA are generated is 2,004,955 photons/mm$^2$/mAs, that is, about 2 mega photons/mm$^2$/mAs. Mega (M) may be used as a unit of a million.

In a detector having a dose of 200 mA, the number of photons that are incident on a unit area of 1 mm$^2$ may be 200*2,004,955 photons/mm$^2$/mAs, that is, about 400 M photons/mm$^2$/mAs. Also, when the detector operates at a dose of 100 mA in consideration of a decrease in a dose of radiation by 50%, the number of photons that are incident on a unit area of 1 mm$^2$ may be 100*2,004,955 photons/mm$^2$/mAs, that is, about 200 M photons/mm$^2$/mAs.

Accordingly, one pixel 500 having a unit area of about 1 mm2 may absorb and count about 200 M or more photons per second.

Accordingly, one pixel 540 having a unit area of about 1 mm$^2$ may absorb and count about 200 M or more photons per second.

Referring to FIG. 5A, the pixel 540 may include 36 sub-pixels (6*6 sub-pixels) as indicated by 541. That is, the front surface of the pixel 540 may correspond to 541. As described above, when the pixel 540 absorbs and counts about 200 M photons per second and includes 36 sub-pixels, one sub-pixel 560 may absorb and count 5.56 M photons (200/36 M photons) per second.

Also, referring to FIG. 5A, the pixel 540 may include 24 sub-pixels (6*4 sub-pixels) as indicated by 542. That is, the front surface of the pixel 540 may correspond to 542. As described above, when the pixel 540 absorbs and counts about 200 M photons per second and includes 24 sub-pixels, one sub-pixel may absorb and count 8.33 M photons (200/24 M photons) per second.

Also, the pixel 540 may include other numbers of sub-pixels as well, such as, for example, 25 sub-pixels (5*5 sub-pixels). As described above, when the pixel 540 absorbs and counts about 200 M photons per second and includes 25 sub-pixels, one sub-pixel 570 may absorb and count 8 M photons (about 200/25 M photons) per second.

Also, an operation of counting incident photons may be independently performed in each sub-pixel (for example, 560), and thus the sub-pixel 560 may be referred to as a 'counting pixel'. Hereinafter, a sub-pixel that is included in the pixel 540 is referred to as a 'counting pixel'. Also, since one pixel value of an image that is restored based on the number of photons which is counted in at least one counting pixel may be determined, a counting pixel group including the at least one counting pixel may be referred to as an image pixel. For example, when one pixel value of an image is obtained based on the number of photons which is counted in all of counting pixels included in the pixel 540, an image pixel is the pixel 540. Alternatively, when one pixel value of an image is obtained based on the number of photons which is counted in all of 4 adjacent counting pixels, an image pixel may be a counting pixel group including the 4 adjacent counting pixels. Accordingly, the number or a size of a counting pixel group may be the same as the number or a size of an image pixel.

For example, assuming that one pixel 541 includes 36 counting pixels, when one pixel value of an image is obtained based on the number of photons which is counted in all of the 36 counting pixels, the pixel 541 may be one image pixel. Alternatively, assuming that one pixel 541 includes 36 counting pixels, when one pixel value of an image is obtained based on the number of photons which is counted in 9 adjacent counting pixels, counting pixel groups 551, 552, 553, or 554 including the 9 adjacent counting pixels may be one image pixel.

The number of image pixels included in the radiation detector 400 is less than the number of counting pixels. Also, a size of an image pixel included in the radiation detector 400 is greater than a size of a counting pixel.

In detail, a counting pixel counts the number of photons which is less than the number of photons that are incident on an image pixel.

In detail, an image pixel corresponds to one pixel value for forming an image, and calculates one pixel value in the image based on the number of all photons which is counted in one image pixel. In detail, an image pixel may include a plurality of counting pixels, and may calculate one pixel value in an image based on the number of all photons which is counted in a counting pixel group including the plurality of counting pixels. When a plurality of counting pixels included in one pixel 540 form one counting pixel group, one pixel 540 may be one image pixel. Alternatively, when a plurality of counting pixels included in the pixel 540 form a plurality of counting pixel groups, since one counting pixel group corresponds to one image pixel, the pixel 410 may include a plurality of image pixels.

Figure 6:
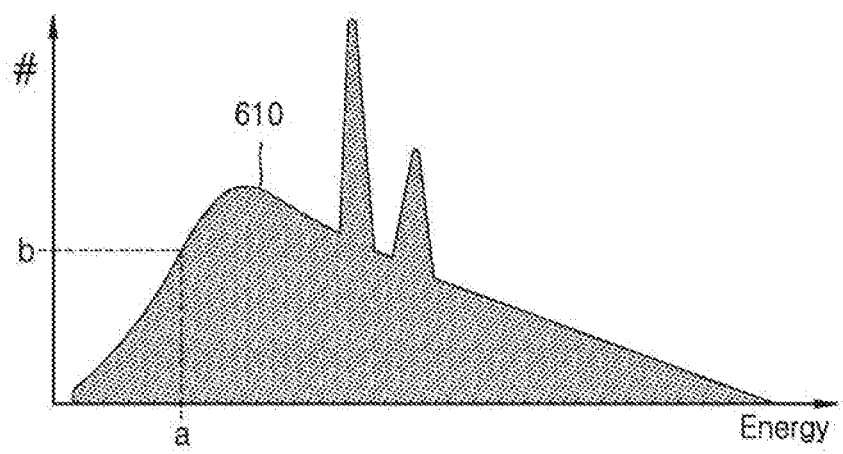
FIG. 6 is a graph for explaining an energy distribution of photons that are incident on a radiation detector.

FIG. 6 is a graph for explaining an energy distribution of photons 610 that are incident on a radiation detector. In FIG. 6, the x-axis represents an energy magnitude, and the y-axis represents the number of photons that are incident on the radiation detector in a predetermined area. For example, 'b' photons having an energy magnitude of 'a' are incident on the predetermined area. For example, the graph of FIG. 6 may be an energy spectrum of photons.

An X-ray source that emits X-rays, for example, the X-ray generating unit 176 of FIG. 1B, may receive a voltage and current through a high voltage generating unit (not shown) to generate X-rays, and may emit the X-rays. The emitted X-rays may have energy of various magnitudes as shown in FIG. 6.

The radiation detector 400 sorts and counts incident photons according to energy magnitudes.

Figure 7A:
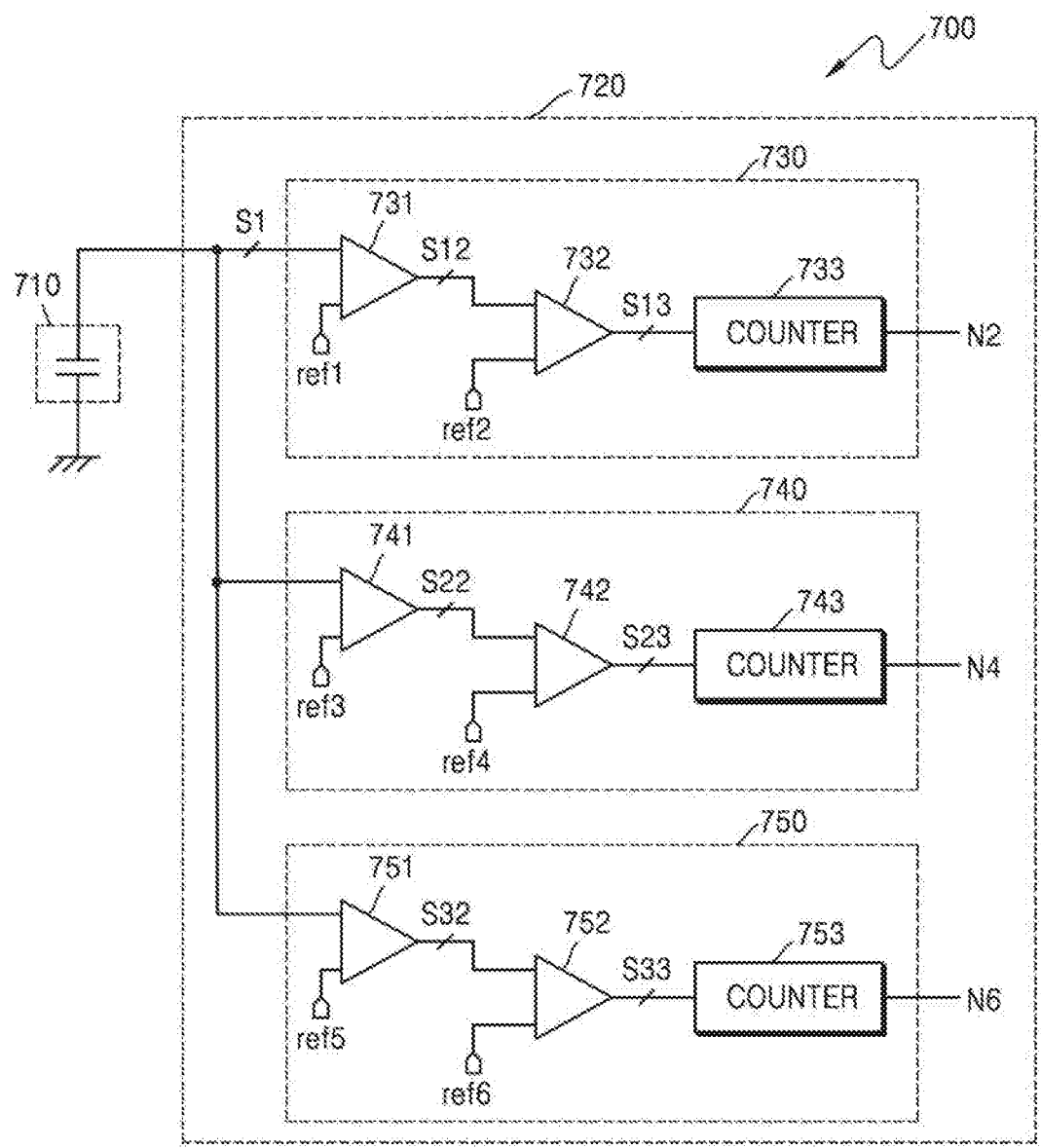
FIG. 7A is a diagram illustrating a radiation detector according to another exemplary embodiment.

FIG. 7A is a diagram illustrating a radiation detector according to another exemplary embodiment. In detail, FIG. 7A illustrates a structure of a unit detector 700 that detects radiation and sorts and counts the radiation according to energy bands.

Figure 5A:
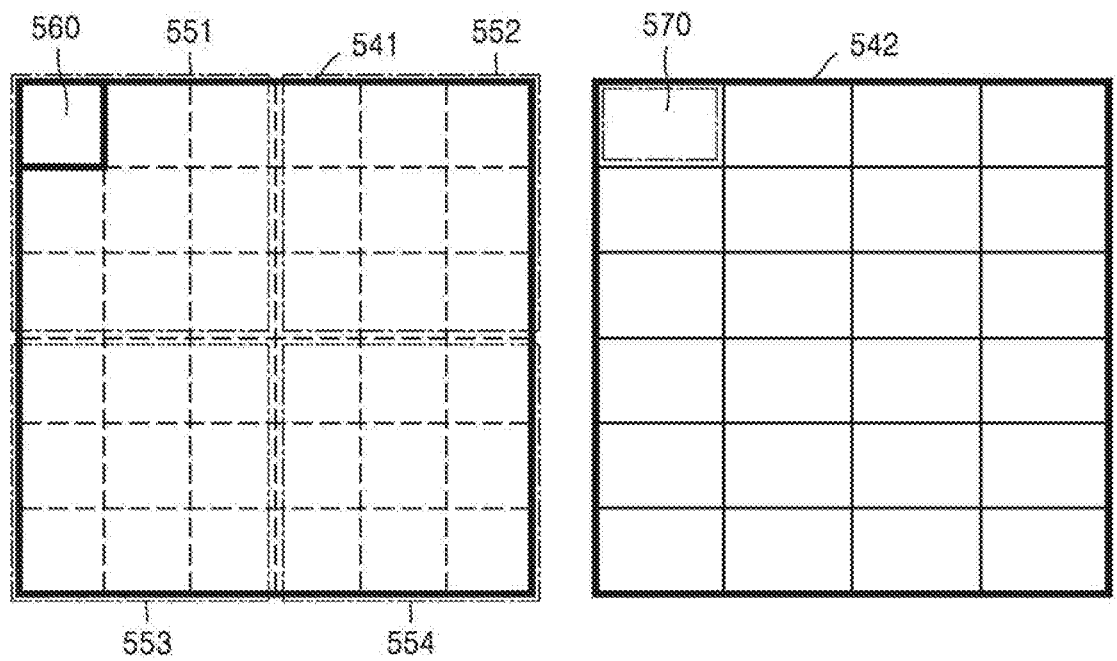

Also, the unit detector 700 may correspond to the pixel 401 or the sub-pixel 560 of FIG. 4 through 5A. That is, the pixel 401 may be the unit detector 700. Also, the sub-pixel 560 may be the unit detector 700. That is, the radiation detector 400 may include a plurality of the unit detectors 700. Also, since one sub-pixel 560 corresponds to one counting pixel, one unit detector 700 may correspond to one counting pixel.

Referring to FIG. 7A, the unit detector 700 includes a radiation absorbing layer 710 and a photon processing unit 720 (e.g., photon processor).

The radiation absorbing layer 710 converts incident photons into a first electrical signal S1. In detail, the radiation absorbing layer 710 converts incident X-ray photons into an electrical signal. In detail, the radiation absorbing layer 710 may convert photons into a hole-electron pair and may generate the first electrical signal S1 corresponding to energy of the incident photons. Also, the first electrical signal S1 may be a voltage signal or a current signal. The following will be explained on the assumption that the first electrical signal S1 is a voltage signal.

The radiation absorbing layer 710 transmits the first electrical signal S1 to the photon processing unit 720 including a plurality of storage units 730, 740, and 750 (e.g., storages) that are connected to a rear terminal of the absorbing layer 710.

In detail, the radiation absorbing layer 710 directly converts the radiation into the first electrical signal S1. The radiation absorbing layer 710 may be formed of cadmium telluride (CdTe). Also, the radiation absorbing layer 710 may be formed of cadmium zinc telluride (CdZnTe), or various other materials known to those of ordinary skill in the art.

Also, when an area of a front surface on which the radiation is incident is about 1 $mm^2$, the radiation absorbing layer 710 may absorb about 200 M photons per second in an area of 1 $mm^2$. Also, when the unit detector 700 of FIG. 7A is included in one sub-pixel and one pixel includes m sub-pixels, the radiation absorbing layer 710 may absorb (200/m) M photons per second as described above.

The photon processing unit 720 includes a plurality of storage units that count and store the number of photons based on a first electrical signal. In detail, the photon processing unit 720 includes a plurality of storage units, namely, first, second, and third storage units 730, 740, and 750, according to the number of energy bands to be distinguished. Also, the photon processing unit 720 counts the number of photons based on an electrical signal that is generated by the radiation absorbing layer 710, by using a direct method of directly converting incident photons into electric charges and detecting the electric charges.

Each of the plurality of storage units, namely, the first, second, and third storage units 730, 740, and 750, compares the first electrical signal with a first reference value to obtain a second electrical signal, and counts and stores the number of photons based on a third electrical signal that is obtained after comparing the second electrical signal with a second reference value.

In detail, the plurality of storage units 730, 740, and 750 sort photons that are absorbed by the radiation absorbing layer 710 according to energy magnitudes. In detail, the plurality of storage units, namely, the first, second, and third storage units 730, 740, and 750, may respectively compare the first electrical signal S1 that is transmitted from the radiation absorbing layer 710 with a plurality of reference values, namely, first reference values ref1, ref3, and ref5, may firstly sort photons according to a plurality of energy bands, and may secondly sort the photons according to a plurality of energy bands.

That is, a counting pixel that is the unit detector 700 includes the radiation absorbing layer 710 that converts incident photons into the first electrical signal S1, a plurality of comparators 731, 732, 741, 742, 751, and 752 that compare the first electrical signal S1 with a plurality of reference values ref1, ref2, ref3, ref4, ref5, and ref6 in order to sort the photons according to a plurality of energy bands, and a plurality of counters 733, 743, and 753 that count and store the number of a plurality of photons that are respectively sorted according to the plurality of energy bands. At least one from among a plurality of reference values in a first counting pixel included in an image pixel is set to be different from at least one from among a plurality of reference values in a second counting pixel included in the image pixel. Setting of different reference values in the first counting pixel and the second counting pixel will be explained below in detail with reference to FIG. 9.

FIG. 7A will be explained on the assumption that the photon processing unit 720 includes three storage units, that is, first through third storage units 730, 740, and 750. It is understood that more or less than three storage units may be employed according to exemplary embodiments.

For example, the first storage unit 730 compares the first electrical signal S1 with the first reference value ref1 to obtain a second electrical signal S12, and counts the number of photons based on a third electrical signal S13 that is obtained after comparing the second electrical signal S12 with the second reference value ref2.

Also, the second storage unit 740 compares the first electrical signal S1 with the first reference value ref3 to obtain a second electrical signal S22 and counts the number of photons based on a third electrical signal S23 that is obtained after comparing the second electrical signal S22 with a second reference value ref4.

Also, the third storage unit 750 compares the first electrical signal S1 with the first reference value ref5 to obtain a second electrical signal S32, and counts the number of photons based on a third electrical signal S33 that is obtained after comparing the second electrical signal S32 with a second reference value ref6.

In detail, at least one of the first reference values ref1, ref3, and ref5 and the second reference values ref2, ref4, and ref6 may be differently set (e.g., set to have different values from each other) in at least one of the plurality of unit detectors.

According to an exemplary embodiment, the term "unit detector" may correspond to a pixel or a sub-pixel. Accordingly, at least one of the first reference values ref1, ref3, and ref5 and the second reference values ref2, ref4, and ref6 may be differently set in at least one of a plurality of pixels. Also, when a pixel included in the radiation detector 400 includes a plurality of sub-pixels, at least one of the first reference values ref1, ref3, and ref5 and the second reference values ref2, ref4, and ref6 may be differently set in at least one of the plurality of sub-pixels.

Setting of the first reference values ref1, ref3, and ref5 and the second reference values ref2, ref4, and ref6 will be explained in detail below with reference to FIGS. 8 through 10.

The first storage unit 730 may include a first comparator 731, a second comparator 732, and a first counter 733.

In the first storage unit 730, when the first electrical signal S1 is equal to or greater than the first reference value ref1, the first comparator 731 outputs the second electrical signal S12 corresponding to a difference value between the first electrical signal S1 and the first reference value ref1.

The second comparator 732 compares the second electrical signal S12 with the second reference value ref2 and outputs the third electrical signal S13.

The first counter 733 counts and stores the number of photons based on the third electrical signal S13.

In the first storage unit 730, an energy band of counted photons is determined by the first reference value ref1 and the second reference value ref2. Photons that are counted by the first counter 733 are included in a first energy band and are used subsequently to restore an image of the first energy band. Hereinafter, an image that is restored by using photons that are included in the first energy band may be referred to as a 'first image'.

In the second storage unit 740, when the first electrical signal S1 is equal to or greater than the first reference value ref3, the first comparator 741 outputs the second electrical signal S22 corresponding to a difference value between the first electrical signal S1 and the first reference value ref3.

The second comparator 742 compares the second electrical signal S22 with the second reference value ref4 and outputs the third electrical signal S23.

A second counter 743 counts and stores the number of photons based on the third electrical signal S23.

In the second storage unit 740, an energy band of counted photons is determined by the first reference value ref3 and the second reference value ref4. Photons that are counted by the second counter 743 are included in a second energy band and are used subsequently to restore an image of the second energy band. Hereinafter, an image that is restored by using photons that are included in the second energy band may be referred to as a 'second image'.

Also, in the third storage unit 750, when the first electrical signal S1 is equal to or greater than the first reference value ref5, the first comparator 751 outputs the second electrical signal S32 corresponding to a difference value between the first electrical signal S1 and the first reference value ref5.

The second comparator 752 compares the second electrical signal S32 with the second reference value ref6 and outputs the third electrical signal S33.

A third counter 753 counts and stores the number of photons based on the third electrical signal S33.

In the third storage unit 750, an energy band of counted photons is determined by the first reference value ref5 and the second reference value ref6. Photons that are counted by the third counter 753 are included in a third energy band and are used subsequently to restore an image of the third energy band. Hereinafter, an image that is restored by using photons that are included in the third energy band may be referred to as a 'third image'.

According to an exemplary embodiment, operations of the first storage unit 730, the second storage unit 740, and the third storage unit 750 are the same, and thus only comparison and counting operations of the first storage unit 730 will be exemplarily explained.

In detail, the first reference value ref1 may be a voltage signal, and the second reference value ref2 may be a current signal. The first reference value ref1 and the second reference value ref2 vary according to an energy band of photons that are used in a multi-energy CT image.

The first comparator 731 may compare the first electrical signal S1 that indicates an energy intensity of photons with the first reference value ref1, and when the first electrical signal S1 is greater than the first reference value ref1, may generate predetermined current corresponding to a difference value between the first electrical signal S1 and the first reference value ref1 as the second electrical signal S12.

The second comparator 732 may compare the second electrical signal S12 with the second reference value ref2 that is a current signal and may output the third electrical signal S13 for determining whether to count the photons.

For example, when the first reference value ref1 is set to 25 keV, the first comparator 731 sorts photons having energy that is equal to or greater than 25 keV. For example, it is assumed that the first electrical signal S1 corresponding to photons is 40 keV and the second reference value ref2 is a current value corresponding to 5 keV. In this case, the first comparator 731 compares 40 keV that is the first electrical signal S1 with 25 keV that is the first reference value ref1, and when the first electrical signal S1 is greater than the first reference value ref1, outputs current corresponding to 15 keV that is a difference value between the first electrical signal S1 and the first reference value ref1 as the second electrical signal S12. The second comparator 732 compares the current corresponding to 15 keV that is the second electrical signal S12 with a current value corresponding to 5 keV that is the second reference value ref2. Since the second electrical signal S12 is greater than the second reference value ref2, the second comparator 732 outputs the third electrical signal S13 for accumulating and counting the number of photons by +1. Then, the first counter 733 accumulates and counts the number of photons by +1 based on the third electrical signal S13. Accordingly, the first storage unit 730 may sort and count the photons having energy that is greater than a value obtained by summing a voltage of the first reference value ref1 and a voltage value corresponding to the second reference value ref2.

Also, when photons whose energy is less than a value obtained by summing a voltage of the first reference value ref1 and a voltage value corresponding to the second reference value ref2 are absorbed by the radiation absorbing layer 710, the second comparator 732 outputs the third electrical signal S13 indicating not to count the number of photons, and thus the first counter 733 does not accumulate and count the number of photons.

In the above example, the first counter 733 may sort and count photons having energy that is greater than 30 keV that is a value obtained by summing a voltage of the first reference value ref1 and a voltage value corresponding to the second reference value ref2.

In detail, the second reference value ref2 may be set as any one of 32 current values from 0 to $2^6-1$. The second reference value ref2 may be finely adjusted by using a plurality of current values having small differences. In detail, the first reference value ref1 may be set as a relatively high voltage value, firstly, photons may be roughly sorted, and secondly, the photons may be finely sorted by using the second reference value ref2.

Accordingly, in each of the first through third storage units 730, 740, and 750, a first reference value and a second reference value may be set in accordance with an image of an energy band to be restored.

As described above, when the first reference values ref1, ref3, and ref5 are set as voltage values and the second reference values ref2, ref4, and ref6 are set as current values, an energy band of photons to be sorted may be gradually changed and set while the number of voltage sources is kept the same as the number of first through third counters 733, 743, and 753.

For example, the second reference values ref2, ref4, and ref6 that are current values may be generated by applying at least one of the first reference values ref1, ref3, and ref5 that are voltage values to an ADC. Accordingly, the second reference values ref2, ref4, and ref6 may be generated without using a separate voltage source other than the first reference values ref1, ref3, and ref5.

Also, the plurality of first reference values ref1, ref3, and ref5 and the plurality of second reference values ref2, ref4, and ref6 that are reference values for sorting photons according to energy magnitudes may be differently set according to a type of incident radiation, a type of a restored image, and a setting of a user. For example, when X-ray photons are incident on the radiation absorbing layer 710, the first counter 733, the second counter 743, and the third counter 753 may respectively set the first reference values ref1, ref3, and ref5 and the second reference values ref2, ref4, and ref6 to count photons having energy that is equal to or greater than 30 keV, 60 kV, and 90 keV.

Figure 7B:
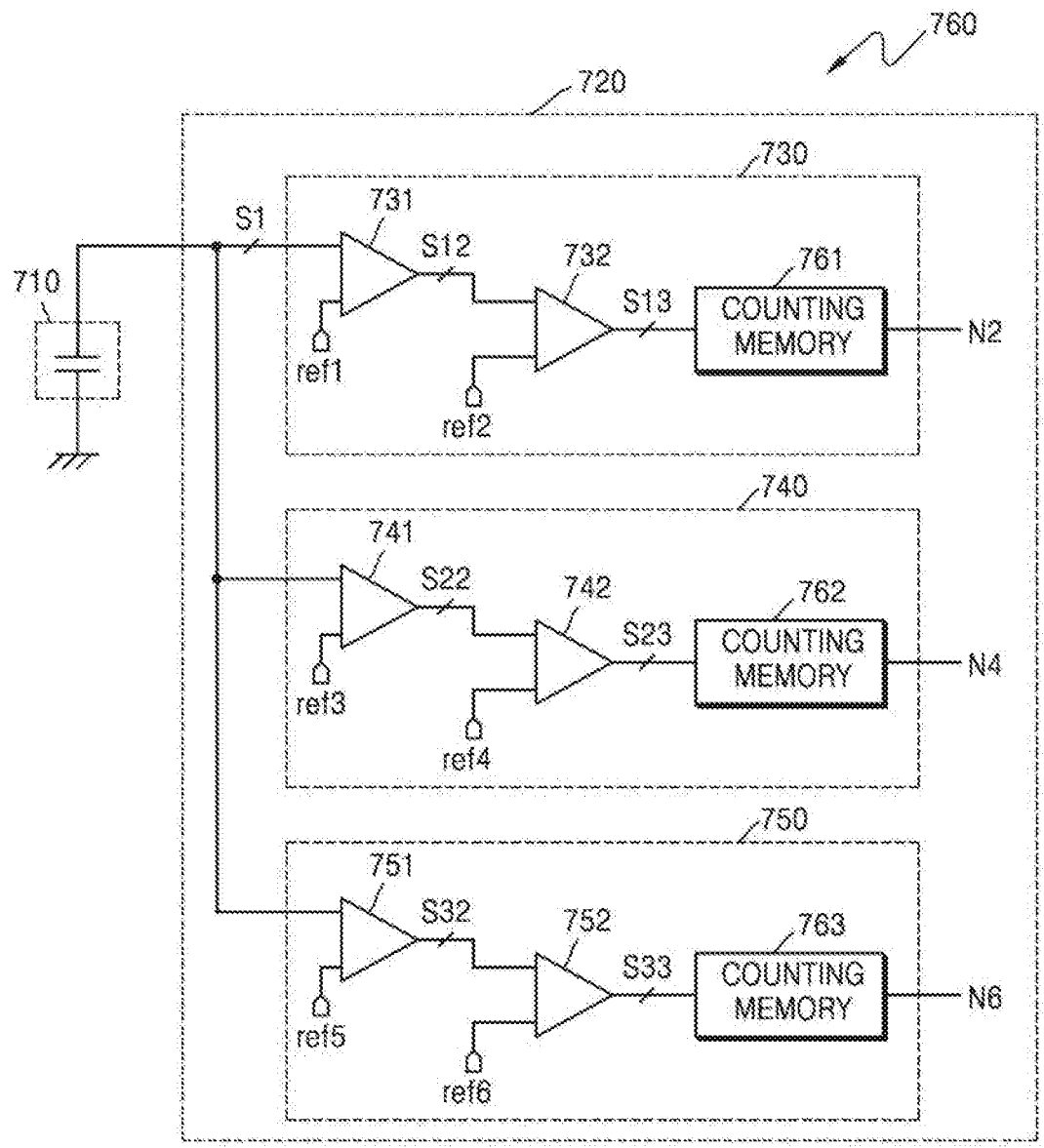
FIG. 7B is a diagram illustrating a radiation detector according to another exemplary embodiment.

FIG. 7B is a diagram illustrating a radiation detector according to another exemplary embodiment. FIG. 7B illustrates a unit detector 760. In FIG. 7B, the same elements as those in FIG. 7A are denoted by the same reference numerals, and thus a repeated explanation thereof will not be given here.

Referring to FIG. 7B, the counters 733, 743, and 753 included in the unit detector 700 of FIG. 7A may be formed as counting memories 761, 762, and 763. While accumulating and counting the number of photons, the counting memories 761, 762, and 763 store the counted number of the photons. For example, each counting memory may be a storage device, e.g., a register, that may store an accumulated number and a counted number.

A storage capacity of a counting memory (for example, 761) may be set according to the number of photons to be counted in one counting pixel for a predetermined period of time. For example, when one pixel including m counting pixels absorbs about n photons for a predetermined period of time, the counting memory 761 has a storage capacity of n/m. For example, when one pixel absorbs and counts about 200 M or more photons per second and includes 25 counting pixels, the counting memory 761 may store bits corresponding to about 8 M in order to store about 200/25 M (=8 M) photons or more.

Also, although the counting memory 761 is included in the photon processing unit 720 in FIG. 7B, the counting memory 761 may be separate from the photon processing unit 720. In detail, the storage unit 730 included in the photon processing unit 720 may include only the comparators 731 and 732 to perform an operation of sorting photons to count the photons, and a counting memory that is connected to a rear end of the photon processing unit 720 may count and store the number of the sorted photons.

FIG. 7C is a diagram illustrating a radiation detector according to another exemplary embodiment. FIG. 7C illustrates a unit detector 780. In FIG. 7C, the same elements as those in FIG. 7A are denoted by the same reference numerals, and thus a repeated explanation thereof will not be given here.

Referring to FIG. 7C, the counters 733, 743, and 753 included in the unit detector 700 of FIG. 7A may be formed as counting devices 781, 784, and 787, and memories 782, 785, and 788. For example, the first storage unit 730 may include the counting device 781 and the memory 782 instead of the counting memory 761 of FIG. 7B.

Referring to the first storage unit 730, the counting device 781 counts the number of photons according to an output signal of the second comparator 732. The memory 782 stores the counted number of the photons. That is, the counting memory 761 of FIG. 7B performs an operation of counting the number of photons and storing the counted number of the photons whereas the counting device 781 and the memory 782 of FIG. 7C respectively perform an operation of counting the number of photons and an operation of storing the counted number of the photons.

Figure 8:
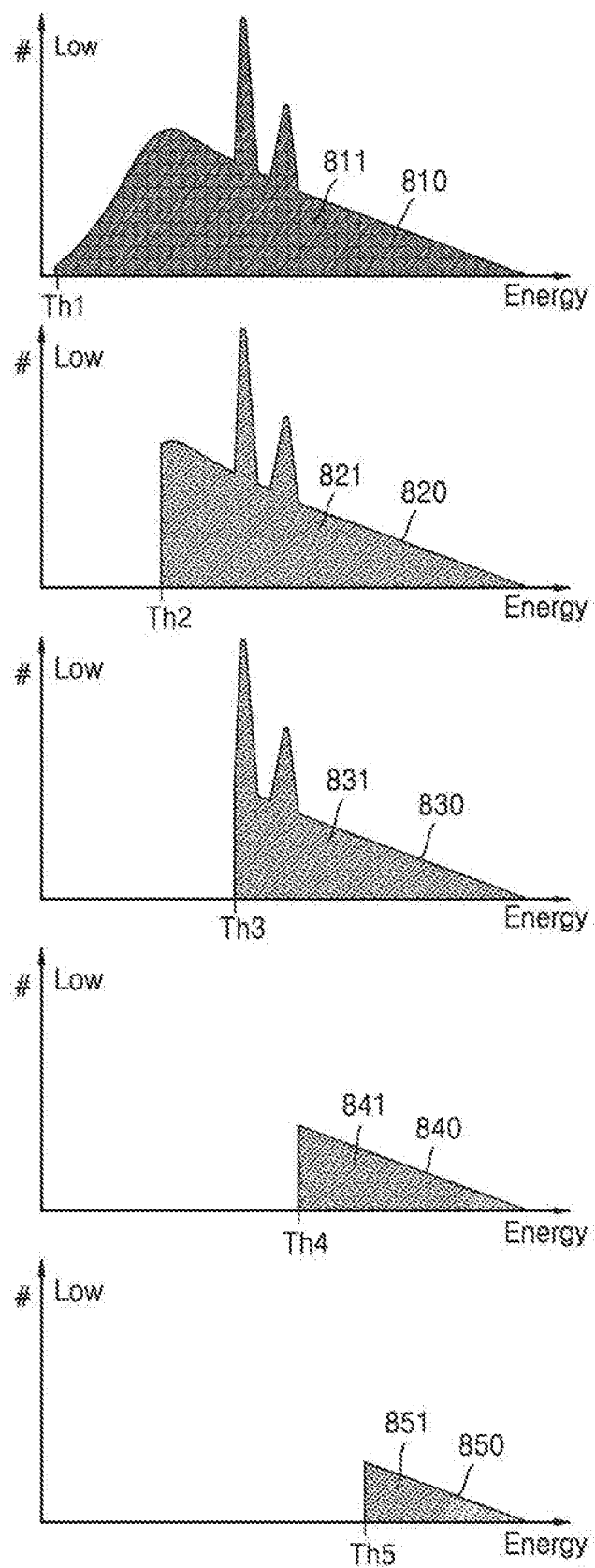
FIG. 8 illustrates graphs for explaining a radiation detector according to an exemplary embodiment.

FIG. 8 illustrates graphs for explaining a radiation detector according to an exemplary embodiment. In the graphs of FIG. 8, the x-axis represents an energy magnitude of photons, and the y-axis represents the number of photons that are incident on the radiation detector in a predetermined area.

At least one of a first reference value and a second reference value of the unit detector 700 may be set to be different from at least one of a first reference value and a second reference value of a unit detector that is disposed adjacent to the unit detector 700.

When the unit detector 700 is used, even when the unit detector 700 includes three counters, photons may be sorted and counted by using more than three energy bands. For example, when the unit detector 700 includes 3 counters, energy bands for sorting photons may be five energy bands including an energy band equal to or greater than Th1, an energy band equal to or greater than Th2, an energy band equal to or greater than Th3, an energy band equal to or greater than Th4, and an energy band equal to or greater than Th5.

Also, it may be set that Th1=30 keV, Th2=60 keV, Th3=75 keV, Th4=90 keV, and Th5=105 keV. In each storage unit, a first reference value and a second reference value may be set to have predetermined values according to an energy band of photons to be sorted.

Also, the number of photons having energy that is equal to or greater than Th1 is used to restore a first image in a multi-energy CT image. The number of photons having energy that is equal to or greater than Th2 is used to restore a second image in the multi-energy CT image. The number of photons having energy that is equal to or greater than Th3 is used to restore a third image in the multi-energy CT image, and the number of photons having energy that is equal to or greater than Th4 is used to restore a fourth image in the multi-energy CT image. Also, the number of photons having energy that is equal to or greater than Th5 is used to restore a fifth image in the multi-energy CT image.

Figure 9A:
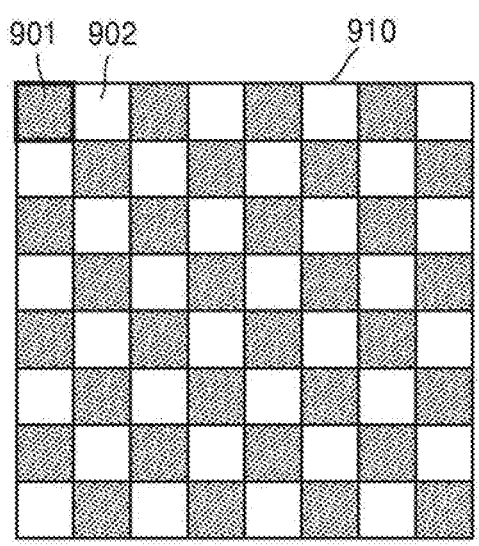
FIGS. 9A and 9B are diagrams for explaining radiation detectors according to other exemplary embodiments.
Figure 9B:
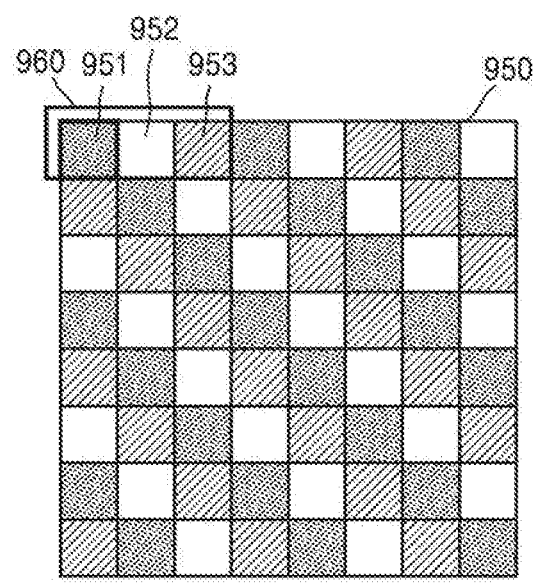

FIGS. 9A and 9B are diagrams for explaining radiation detectors 910 and 950 according to other exemplary embodiments.

Referring to FIGS. 9A and 9B, each of the radiation detectors 910 and 950 includes a plurality of pixels.

Referring to FIG. 9A, when the radiation detector 910 includes a plurality of pixels, for example, first and second pixels 901 and 902, an energy band of photons to be sorted may be differently set in the first pixel 901 and the second pixel 902 that are disposed adjacent to each other. That is, at least one of a first reference value and a second reference value may be differently set in the first pixel 901 and the second pixel 902 that are disposed adjacent to each other.

In detail, the second reference values ref2, ref4, and ref6 that are used in at least one of the plurality of storage units, namely, the first, second, and third storage units 730, 740, and 750, may be differently set in the first pixel 901 and the second pixel 902 that is disposed adjacent to the first pixel 901 from among the plurality of pixels.

For example, in the first pixel 901, the first reference value ref1 may be set to 30 keV and the second reference value ref2 may be set to a current value corresponding to 0 keV so that the first storage unit 730 may sort and count photons having energy that is equal to or greater than Th1=30 keV, as shown in graph 811.

In the first pixel 901, the first reference value ref3 may be set to 60 keV and the second reference value ref4 may be set to a current value corresponding to 0 keV so that the second storage unit 740 may sort and count photons having energy that is equal to or greater than Th2=60 keV, as shown in graph 821.

In the first pixel 901, the first reference value ref5 may be set to 90 keV and the second reference value ref6 may be set to a current value corresponding to 0 keV so that the third storage unit 750 may sort and count photons having energy that is equal to or greater than Th4=90 keV, as shown in graph 841.

Also, in the second pixel 902, the first reference value ref1 may be set to 30 keV and the second reference value ref2 may be set to a current value corresponding to 0 keV so that the first storage unit 730 may sort and count photons having energy that is equal to or greater than Th=30 keV, as shown in graph 811.

In the second pixel 902, the first reference value ref3 may be set to 60 keV and the second reference value ref4 may be set to a current value corresponding to 15 keV so that the first storage unit 740 may sort and count photons having energy that is equal to or greater than Th3=75 keV, as shown in graph 841. That is, although the second reference value ref4 in the first pixel 901 is set to a current value corresponding to 0 keV, the second reference value ref4 in the second pixel 902 may be set to a current value corresponding to 15 keV. Accordingly, the second counter 743 included in the first pixel 901 and the second counter 743 included in the second pixel 902 may sort and count photons having different energy bands.

In the second pixel 902, the first reference value ref5 may be set to 90 keV and the second reference value ref6 may be set to a current value corresponding to 15 keV so that the third storage unit 750 may sort and count photons having energy that is equal to or greater than Th5=105 keV, as shown in graph 851.

In the above example, energy bands that may be sorted by the first pixel 901 may be set to an energy band equal to or greater than 30 keV, an energy band equal to or greater than 60 keV, and an energy band equal to or greater than 90 keV by differently setting a second reference value and by using 30 keV, 60 keV, and 90 keV that are 3 voltage values as voltage sources. Energy bands that may be sorted by the second pixel 902 may be set to an energy band equal to or greater than 30 keV, an energy band equal to or greater than 75 keV, and an energy band equal to or greater than 105 keV.

The second reference values ref2, ref4, and ref6 applied to the first pixel 901 may be set to be greater or less than the second reference values ref2, ref4, and ref6 applied to the second pixel 902. Accordingly, at least one of energy bands of photons that are sorted by the first pixel 901 and at least one of energy bands of photons that are sorted by the second pixel 902 may be different from each other.

Also, the first reference values ref1, ref3, and ref5 that are used in at least one of the plurality of storage units, namely, the first, second, and third storage units 730, 740, and 750, may be differently set in the first pixel 901 and the second pixel 902 that is disposed adjacent to the first pixel 901 from among the plurality of pixels.

Also, at least one of the first reference value and the second reference value may be differently set in each pixel in a pixel group including a plurality of adjacent pixels.

As described above, the number of photons having energy that is equal to or greater than Th1 is used to restore a first image in a multi-energy CT image. The number of photons having energy that is equal to or greater than Th2 is used to restore a second image in the multi-energy CT image. The number of photons having energy that is equal to or greater than Th3 is used to restore a third image in the multi-energy CT image. The number of photons having energy that is equal to or greater than Th4 is used to restore a fourth image in the multi-energy CT image. Also, the number of photons having energy that is equal to or greater than Th5 is used to restore a fifth image in the multi-energy CT image.

Accordingly, the radiation detector 910 of FIG. 9 may set in various ways so that an energy band may be obtained by adjusting at least one of a first reference value and a second reference value of the unit detector 700.

Also, the first reference value may be roughly set, and the second reference value may be finely set. In detail, an error that may occur when photons are sorted by using only a voltage value may be avoided by precisely sorting photons, which have already been sorted according to the first reference value, by using the second reference value.

Referring to FIG. 9B, when the radiation detector 950 includes a plurality of pixels, namely, first, second, and third pixels 951, 952, and 953, adjacent pixels may be grouped to include a predetermined number of pixels and an energy band of photons to be sorted may be differently set in the first, second, and third pixels 951, 952, and 953 that are included in a pixel group 960. That is, at least one of a first reference value and a second reference value may be differently set in the first pixel 951, the second pixel 952, and the third pixel 953 included in the pixel group 960.

For example, in the first pixel 951, a first reference value and a second reference value may be set to sort and count photons having energy that is equal to or greater than Th1=30 keV, Th2=60 keV, and Th4=90 keV. Also, in the second pixel 952, a first reference value and a second reference value may be set to sort and count photons having energy that is equal to or greater than Th1=30 keV, Th3=75 keV, and Th5=105 keV. Also, in the third pixel 953, a first reference value and a second reference value may be set to sort and count photons having energy that is equal to or greater than Th1=30 keV, Th6=80 keV, and Th7=110 keV.

Figure 10:
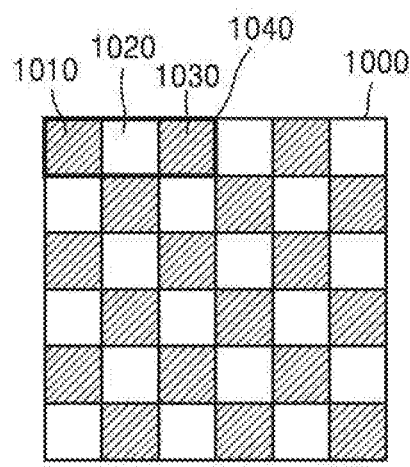
FIG. 10 is a diagram for explaining a radiation detector according to another exemplary embodiment.

FIG. 10 is a diagram for explaining a radiation detector 1000 according to another exemplary embodiment.

Referring to FIG. 10, the radiation detector 1000 includes a plurality of sub-pixels, namely, first, second, and third sub-pixels 1010, 1020, and 1030.

An energy band of photons to be sorted and counted may be differently set in the first sub-pixel 1010 and the second sub-pixel 1020 that are disposed adjacent to each other. That is, at least one of a first reference value and a second reference value may be differently set in the first sub-pixel 1010 and the second sub-pixel 1020 that are disposed adjacent to each other.

Also, adjacent sub-pixels may be grouped to include a predetermined number of sub-pixels, and an energy band of photons to be sorted may be differently set in sub-pixels included in a sub-pixel group 1040. That is, when the sub-pixel group 1040 includes three adjacent sub-pixels, at least one of a first reference value and a second reference value may be differently set in the first sub-pixel 1010, the second sub-pixel 1020, and the third sub-pixel 1030 included in the sub-pixel group 1040.

For example, in the first sub-pixel 1010, a first reference value and a second reference value may be set to sort and count photons having energy that is equal to or greater than Th1=30 keV, Th2=60 keV, and Th4=90 keV. Also, in the second sub-pixel 1020, a first reference value and a second reference value may be set to sort and count photons having energy that is equal to or greater than Th1=30 keV, Th3=75 keV, and Th5=105 keV. Also, in the third sub-pixel 1030, a first reference value and a second reference value may be set to sort and count photons having energy that is equal to or greater than Th1=30 keV, Th6=80 keV, and Th7=110 keV.

Figure 11:
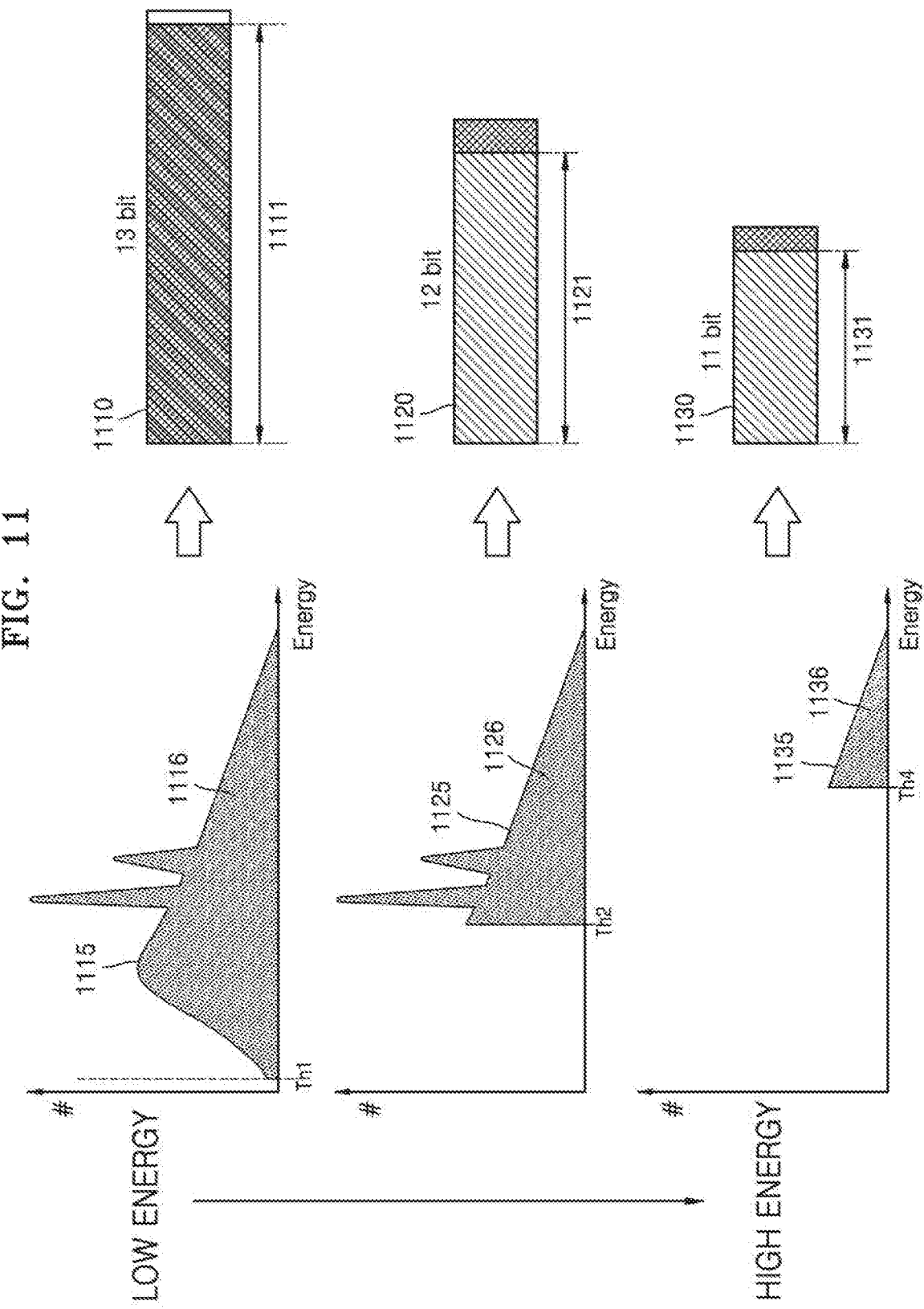
FIG. 11 is a diagram for explaining a radiation detector according to another exemplary embodiment.

FIG. 11 is a diagram for explaining a radiation detector according to another exemplary embodiment.

Also, in the unit detector 700, the plurality of counters, that is, the first through third counters 733, 743, and 753, count the number of photons that are sorted according to energy magnitudes. Each counter may be a counter or a counting memory that accumulates and counts the number of photons as described above with reference to FIG. 7B.

A plurality of counters, that is, first through third counters 1110, 1120, and 1130, of FIG. 11 correspond to the plurality of counters, that is, the first through third counters 733, 743, and 753, of the unit detector 700.

In detail, the first through third counters 733, 743, and 753 count and store the number of photons that are respectively sorted according to a plurality of energy bands, and have sizes corresponding to reference values that are used to sort the photons.

As in the above exemplary embodiment, when sorted energy bands are set to an energy band equal to or greater than Th1=30 keV, an energy band equal to or greater than Th2=60 keV, and an energy band equal to or greater than Th3=90 keV, the first counter 733 counts the number of photons having energy that is equal to or greater than 30 keV, and stores the counted number of the photons. The second counter 743 counts the number of photons having energy that is equal to or greater than 60 keV, and the third counter 753 counts the number of photons having energy that is equal to or greater than 90 keV.

Referring to FIG. 11, the number of photons having energy that is equal to or greater than Th1=30 keV is proportional to an area 1116 of graph 1115, the number of photons having energy that is equal to or greater than Th2=60 keV is proportional to an area 1126 of graph 1125, and the number of photons having energy that is equal to or greater than Th4=90 keV is proportional to an area 1136 of graph 1135.

Accordingly, the first counter 1110 may have a size corresponding to the area 1116, the second counter 1120 may have a size corresponding to the area 1126, and the third counter 1130 may have a size corresponding to the area 1136.

As described above, sizes of the first counter 1110, the second counter 1120, and the third counter 1130 may be differently determined to correspond to energy values of sorted photons.

Since energy bands of sorted photons vary according to at least one of a first reference value and a second reference value, a size of a counter may be determined based on at least one of the first reference value and the second reference value.

In detail, a counter may have a first bit depth when an energy band of sorted photons is a low energy band and may have a second bit depth that is less than the first bit depth when an energy band of sorted photons is a high energy band.

Referring to FIG. 11, photons that are counted by the first counter 1110 have lower energy than photons that are counted by the second and third counters 1120 and 1130. Accordingly, when a bit depth of the first counter 1110 is 13, a bit depth of the second counter 1120 may be 12, which is less than the bit depth of the first counter 1110, and a bit depth of the third counter 1130 may be 11, which is less than the bit depth of the second counter 1120.

Also, a size of each of the plurality of counters, namely, first, second, and third counters 1110, 1120, and 1130, may vary according to a minimum energy value of sorted photons. Also, a minimum energy value of photons that are counted by a counter may correspond to minimum values Th1, Th2, and Th4 of an energy band.

In detail, a size of a counter may be inversely proportional to an energy value of sorted photons.

Figure 12:
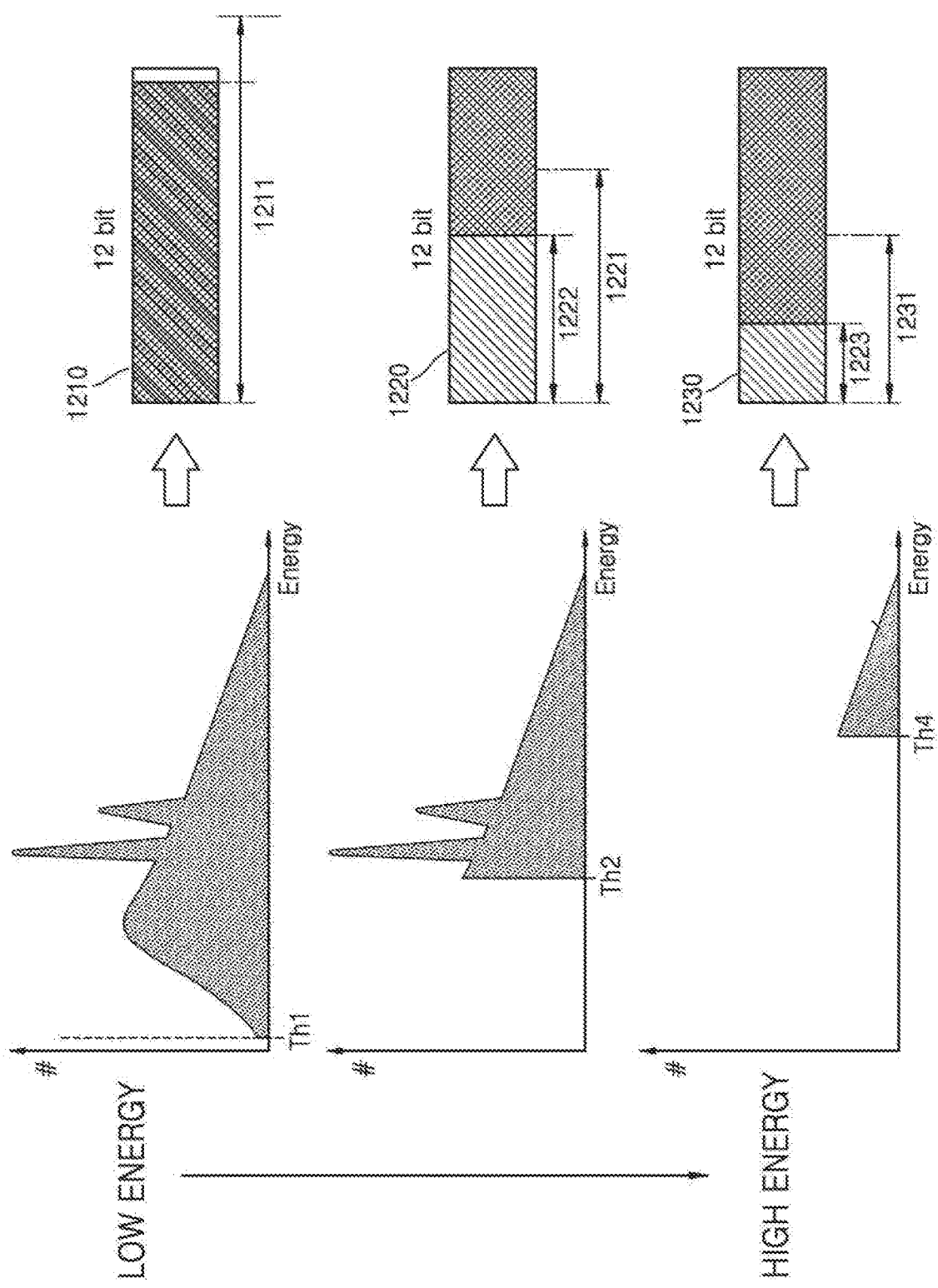
FIG. 12 is a diagram for explaining a general radiation detector.

FIG. 12 is a diagram for explaining a general radiation detector.

In FIG. 11, when a bit depth of the first counter 1110 is 13, a bit depth of the second counter 1120 is 12, and a bit depth of the third counter 1130 is 11, a total size of the first through third counters 1110, 1120, and 1130 that are included in the unit detector 700 corresponds to 36 bits.

In the general radiation detector, when a plurality of counters is included in one pixel in order to measure multi-energy, the plurality of counters have the same size.

Referring to FIG. 12, in the general radiation detector, a plurality of counters, that is, first through third counters 1210, 1220, and 1230, may have the same size. When a total size of counters that are included in one pixel is 36 bits as shown in FIG. 9, each of the plurality of counters, namely, the first, second, and third counters 1210, 1220, and 1230, has a bit depth of 12.

For example, it is assumed that the number of photons having energy that is equal to or greater than Th1=30 keV corresponds to 13 bits 1211, the number of photons having energy that is equal to or greater than Th2=60 keV corresponds to 11 bits 1221, and the number of photons having energy that is equal to or greater than Th4=90 keV corresponds to 10 bits 1231.

In the general radiation detector, since a size of the first counter 1210 is 12 bits, the first counter 1210 is saturated in a state where all photons having energy that is equal to or greater than Th1=30 keV are not counted.

Once the first counter 1210 is saturated, the second counter 1220 and the third counter 1230 may no longer perform a counting operation. Accordingly, although the number of photons having energy that is equal to or greater than Th2=60 keV corresponds to 11 bits 1221, the second counter 1220 stores only a smaller number of photons as a bit number 1222. Also, although the number of photons having energy that is equal to or greater than Th4=90 keV corresponds to 10 bits 1231, the third counter 1230 only stores a smaller number of photons as a bit number 1223.

In contrast, since a radiation detector according to any of the exemplary embodiments has a plurality of counters whose sizes vary according to energy values of photons, the radiation detector may sufficiently count the number of photons corresponding to each energy band while minimizing the sizes of the counters. Accordingly, the number of photons that may be measured may be increased, and thus photon detection performance according to an energy band may be increased.

In detail, referring to FIG. 11, since the number of photons that are counted by the first counter 1110 is 1111, which is less than a capacity of the first counter 1110, the first counter 1110 is not saturated until all photons having energy that is equal to or greater than Th1=30 keV are counted. Accordingly, the second counter 1120 and the third counter 1130 may also sufficiently count photons.

Also, since bits that remain without being used in the second counter 1220 and the third counter 1230 of FIG. 12 may be removed, a size of each counter may be minimized.

Figure 13:
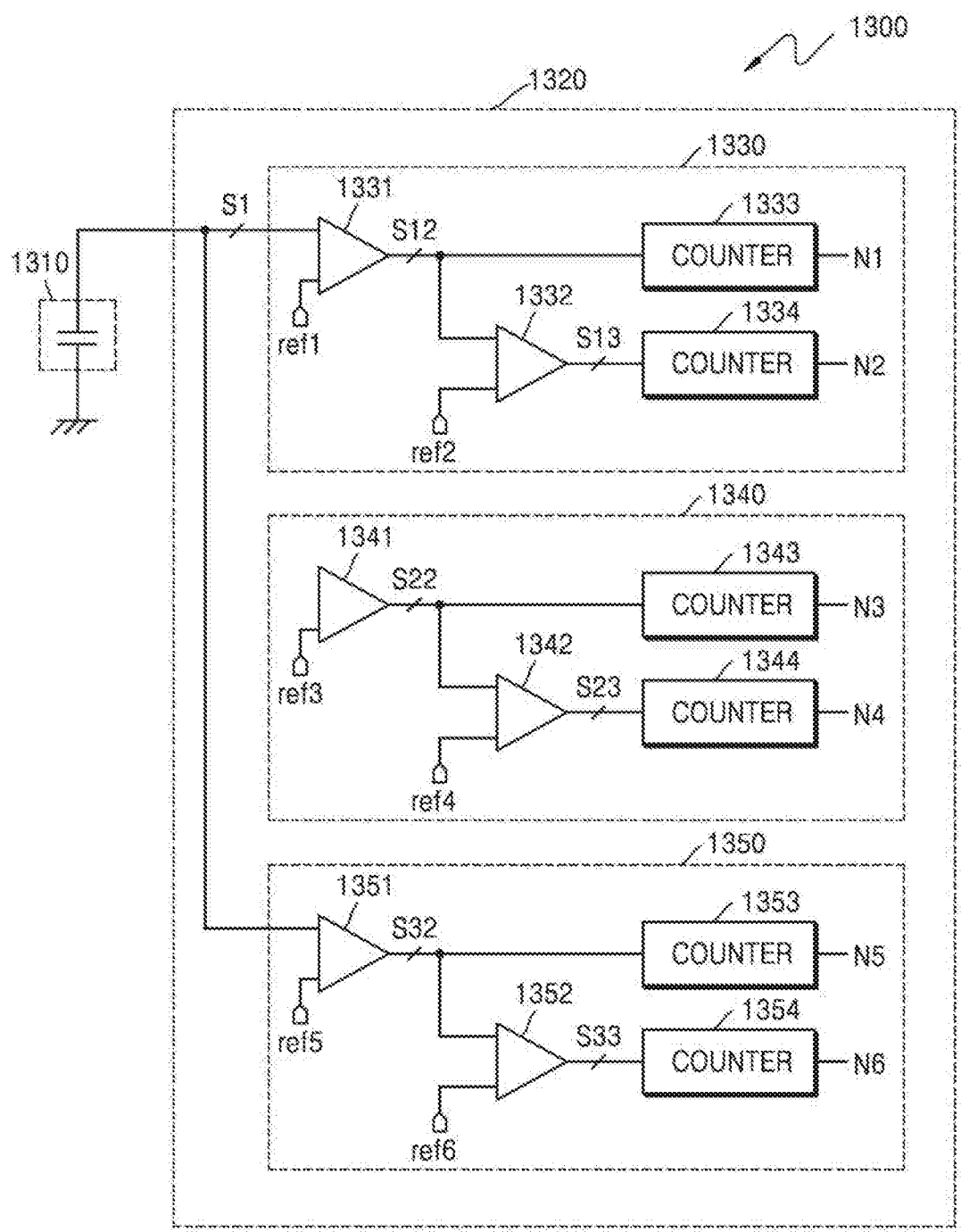
FIG. 13 is a diagram illustrating a radiation detector according to another exemplary embodiment.

FIG. 13 is a diagram illustrating a radiation detector according to another exemplary embodiment. The radiation detector of FIG. 13 includes a plurality of unit detectors 1300. Each of the unit detectors 1300 may correspond to the pixel 401 or the sub-pixel 560 of FIG. 4 or 5A.

In FIG. 13, a radiation absorbing layer 1310 and a photon processing unit 1320 respectively correspond to the radiation absorbing layer 710 and the photon processing unit 720 of FIG. 7A, and thus a repeated description thereof will not be given here. The unit detector 1300 may further include a plurality of counters 1334, 1344, and 1354, in addition to the unit detector 700. A first storage unit 1330 will be exemplarily explained. For convenience of explanation, the counter 1334 that is connected to an output terminal of a second comparator 1332 is referred to as the first counter 1334, and a counter 1333 that is connected to an output terminal of a first comparator 1331 is referred to as a second counter 1333.

The first storage unit 1330 compares the first electrical signal S1 with the first reference value ref1 to obtain the second electrical signal S12 and counts the number of photons based on the second electrical signal S12. The first storage unit 1330 counts the number of photons based on the third electrical signal S13 that is obtained after comparing the second electrical signal S12 with the second reference value ref2.

In detail, the first storage unit 1330 stores the number of counted photons counted based on the second electrical signal S12 in the second counter 1333 and stores the number of counted photons based on the third electrical signal S13 in the first counter 1334.

In detail, the first storage unit 1330 may further include the second counter 1333 that is connected to a first comparator 1331, when compared to the first storage unit 730 described in FIG. 7.

For example, when the first reference value ref1 is set to 25 keV, the first comparator 1331 sorts photons having energy that is equal to or greater than 25 keV. For example, it is assumed that the first electrical signal S1 corresponding to photons is 40 keV and the second reference value ref2 is a current value corresponding to 5 keV. In this case, the first comparator 1331 compares 40 keV that is the first electrical signal S1 with 25 keV that is the first reference value ref1, and since the first electrical signal S1 is greater than the first reference value ref1, outputs current corresponding to 15 keV that is a difference value between the first electrical signal S1 and the first reference value ref1 as the second electrical signal S12. The second counter 1333 accumulates and counts the number of photons by +1 based on the second electrical signal S12. The second comparator 1332 compares the current corresponding to 15 keV that is the second electrical signal S12 with a current value corresponding to 5 keV that is the second reference value ref2. Since the second electrical signal S12 is greater than the second reference value ref2, the second comparator 1332 outputs the third electrical signal S13 for accumulating and counting the number of photons by +1. The first counter 1334 accumulates and counts the number of photons by +1 based on the third electrical signal S13. Accordingly, the second counter 1333 may sort and counter the photons having energy that is greater than a voltage value of the first reference value ref1. The first counter 1334 may sort and count the photons having energy that is equal to or greater than a value that is obtained by summing a voltage of the first reference value ref1 and a voltage value corresponding to the second reference value ref2.

Operations and structures of a second storage unit 1340 and a third storage unit 1350 are the same as those of the first storage unit 1330, and thus a repeated description thereof will not be given here.

As described above, since each storage unit (for example, the first storage unit 1330, second storage unit 1340, and third storage unit 1350) of the unit detector 1300 includes the first counter 1334 and the second counter 1333, the number of energy bands of photons that may be counted by the unit detector 1300 may be increased. Accordingly, when the unit detector 1300 is used, the number of images according to obtainable energy bands may also be increased.

Figure 14:
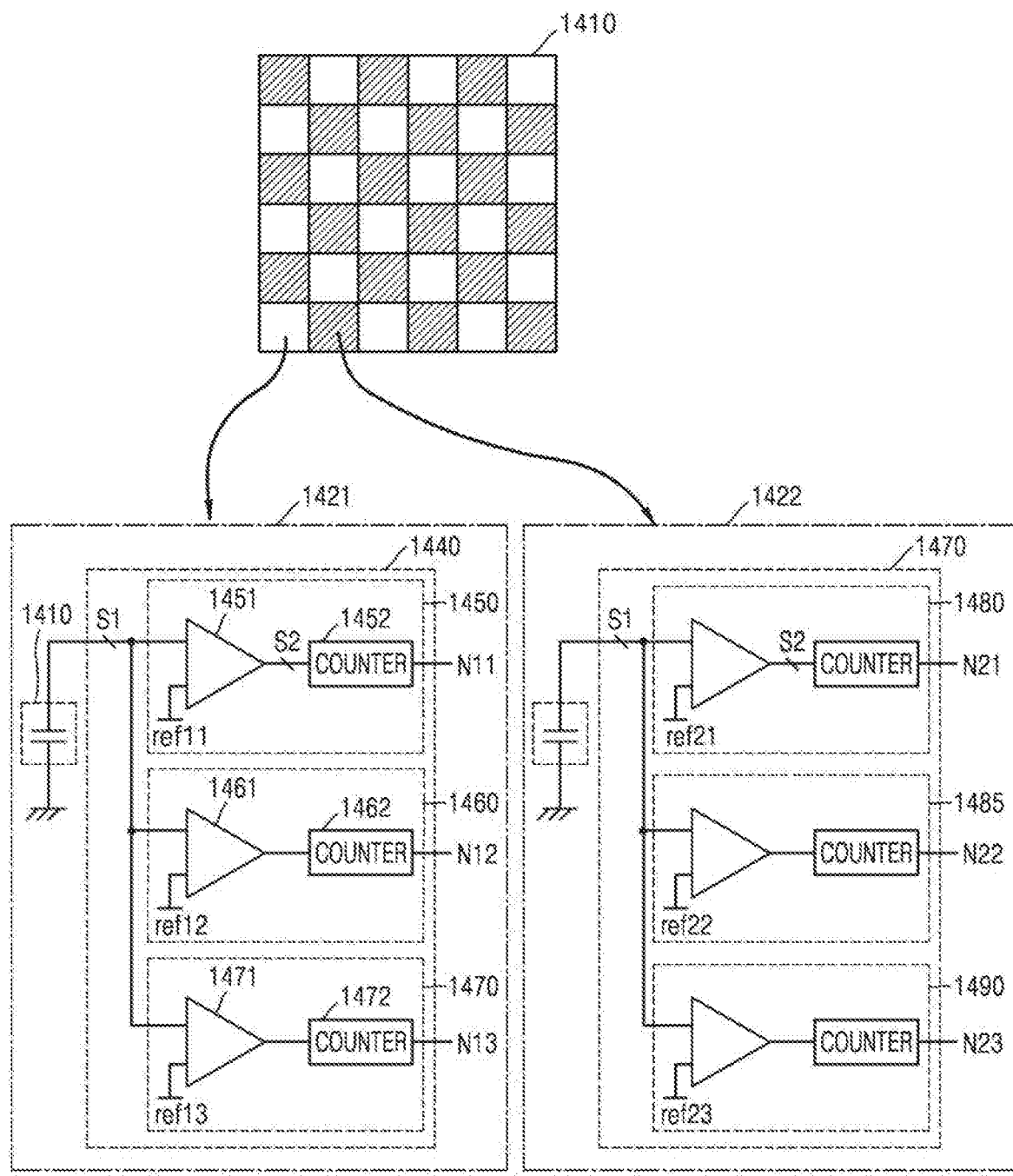
FIG. 14 is a diagram illustrating a radiation detector according to another exemplary embodiment.

FIG. 14 is a diagram illustrating a radiation detector 1410 according to another exemplary embodiment. In detail, the radiation detector 1410 includes a plurality of unit detectors, that is, first and second unit detectors 1421 and 1422. For example, the first unit detector 1421 may correspond to the pixel 401 or the sub-pixel 560 of FIGS. 4 through 5A.

The radiation detector 1410 of FIG. 14 includes the first unit detector 1421 that detects radiation and the second unit detector 1422 that is disposed adjacent to the first unit detector 1421.

In detail, the plurality of unit detectors, that is, the first and second unit detectors 1421 and 1422, are included in the radiation detector 1410 and may have the same structure as each other, and a reference value that is input to a comparator may vary according to each unit detector.

The first unit detector 1421 includes a radiation absorbing layer 1430 that converts incident photons into the first electrical signal S1, and a photon processing unit 1440 including a plurality of storage units that compare the first electrical signal S1 with a first reference value ref11 to obtain the second electrical signal S2 and count and store the number of photons based on the second electrical signal S2.

Although the first unit detector 1421 includes first, second, and third storage units 1450, 1460, and 1470 in FIG. 14, the present exemplary embodiment is not limited thereto and the first unit detector 1421 may include more or less than three storage units according to exemplary embodiments.

The second unit detector 1422 has the same structure as that of the first unit detector 1421, and thus a detailed explanation thereof will not be given here.

At least one first reference value (at least one of ref11, ref12, and ref13) used in at least one of the first through third storage units 1450, 1460, and 1470 that are included in the first unit detector 1421 may be different from at least one first reference value (at least one of ref21, ref22, and ref23) that is used in at least one of a plurality of storage units, namely, first, second, and third storage units 1480, 1485, and 1490 that are included in the second unit detector 1422.

For example, when a user sets the reference values such that ref11=30 keV, ref12=60 keV, and ref13=90 keV in the first unit detector 1421, the user may set the reference values such that ref21=30 keV, ref22=75 keV, and ref23=1105 keV in the second unit detector 1422.

In detail, the radiation absorbing layer 1430 converts incident photons into the first electrical signal S1. In detail, the radiation absorbing layer 1430 converts incident X-ray photons into the first electrical signal S1. In detail, the radiation absorbing layer 1430 may convert photons into a hole-electron pair and may generate the first electrical signal S1 corresponding to energy of the incident photons. Also, the first electrical signal S1 may be a voltage signal or a current signal. The following will be explained on the assumption that the first electrical signal S1 is a voltage signal.

The radiation absorbing layer 1430 transmits the first electrical signal S1 to the first through third storage units 1450, 1460, and 1470 that are connected to a rear terminal of the radiation absorbing layer 1430. The radiation absorbing layer 1430 corresponds to the radiation absorbing layer 710 of FIG. 7A, and thus a repeated description thereof will not be given here.

The photon processing unit 1440 includes a plurality of storage units that count and store the number of photons based on the first electrical signal S1. In detail, the photon processing unit 1440 includes the first through third storage units 1450, 1460, and 1470 according to the number of energy bands to be distinguished.

Each storage unit may compare the first electrical signal S1 with a first reference value to obtain the second electrical signal S2 and count and store the number of photons based on the second electrical signal S2. For example, the first storage unit 1450 compares the first electrical signal S1 with the first reference value ref11 to obtain the second electrical signal S2 and counts and stores the number of photons based on the second electrical signal S2.

Each storage unit may include a first comparator and a first counter. For example, the first storage unit 1450 may include a first comparator 1451 and a first counter 1452.

In detail, the first comparator 1451 may compare the first electrical signal S1 with the first reference value ref11, and when the first electrical signal S1 is greater than the first reference value ref11, the first comparator 1451 may output a signal for accumulation and counting to the first counter 1452.

Also, a second comparator 1461 may compare the first electrical signal S1 with the second reference value ref12, and when the first electrical signal S1 is greater than the second reference value ref12, the second counter 1461 may output a signal for accumulation and counting to a second counter 1462.

Also, a third comparator 1471 may compare the first electrical signal S1 with the third reference value ref13, and when the first electrical signal S1 is greater than the third reference value ref13, the third comparator 1471 may output a signal for accumulation and counting to a third counter 1472.

For example, when the first comparator 1451 is biased to a +Vh voltage and a −Vh voltage, the first comparator 1451 may output the +Vh voltage as a signal of a logic high level, and may output the −Vh voltage as a signal of a logic low level. The first comparator 1451 may output the +Vh voltage value corresponding to a logic high value when a level of an electrical signal corresponding to photons is greater than the first reference value ref11, and the first counter 1452 may accumulate the number of photons by +1 and count the number of the photons when the +Vh voltage value is input. The first comparator 1451 outputs the −Vh voltage value when the level of the electrical signal corresponding to the photons is less than the first reference value ref11, and the first counter 1452 does not accumulate and count the number of photons when the −Vh voltage value is input.

Each of the first through third storage units 1450, 1460, and 1470 may sort and count photons into a plurality of energy bands according to the first reference values ref11, ref12, and ref13.

Since the radiation detector 1410 of FIG. 14 differently sets first reference values that are used in order to compare energy magnitudes of photons in the first unit detector 1421 and the second unit detector 1422 that are disposed adjacent to each other, the number of energy bands that may be measured may be increased.

Figure 15:
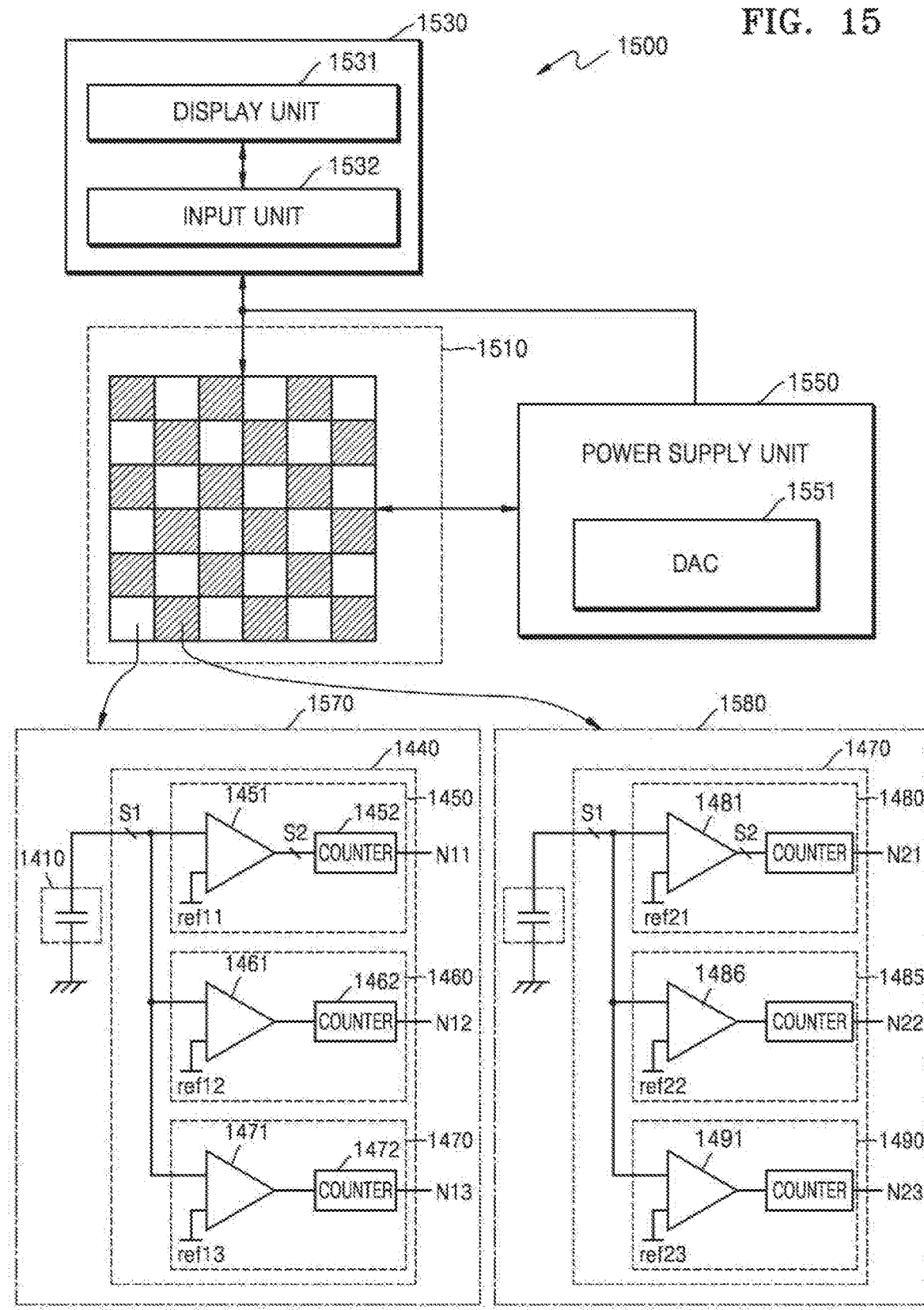
FIG. 15 is a diagram illustrating a radiation detecting apparatus according to an exemplary embodiment.

FIG. 15 is a diagram illustrating a radiation detecting apparatus according to an exemplary embodiment. Also, a structure of a unit detector included in the radiation detector 1510 may correspond to that of any of the unit detectors 700, 760, and 780 of FIGS. 7A, 7B, and 7C.

For example, the radiation detecting apparatus includes radiation detector 1510. The following will be explained on the assumption that a CT system is used as a radiation detecting apparatus.

Referring to FIG. 15, the CT imaging apparatus 1500 includes a radiation detector 1510 including a plurality of unit detectors 1570 and 1580. A structure of the radiation detector 1510 including the plurality of unit detectors 1570 and 1580 corresponds to that of the radiation detector 1410 including the first and second unit detectors 1421 and 1422 of FIG. 14, and thus a repeated description thereof will not be given here. Also, a structure of a unit detector included in the radiation detector 1510 may correspond to that of any of the unit detectors 700, 760, and 780 of FIGS. 7A, 7B, and 7C.

Referring to FIG. 15, the radiation detector 1510 includes the plurality of unit detectors 1570 and 1580. The plurality of unit detectors 1570 and 1580 have the same structure, and a reference value that is input to a comparator may vary according to each unit detector. The unit detector 1570 will be exemplarily explained as a unit detector included in the radiation detector 1510. Hereinafter, any one of the plurality of unit detectors that are included in the radiation detector 1510 may be referred to as a first unit detector 1570, and another unit detector adjacent to the first unit detector 1570 may be referred to as a second unit detector 1580.

Also, the first unit detector 1570 may be a pixel or a sub-pixel. Also, a pixel size may be equal to or less than 1 $mm^2$, and thus an area of a front surface of the first unit detector 1570 may be equal to or less than 1 $mm^2$. Accordingly, when the first unit detector 1570 corresponds to a pixel, a size of a front surface of the first unit detector 1570 may be equal to or less than 1 $mm^2$.

The first unit detector 1570 includes the radiation absorbing layer 1430 and the photon processing unit 1440. The photon processing unit 1440 includes the plurality of comparators, that is, the first through third comparators 1451, 1461, and 1471 and the plurality of counters, that is, the first through third counters 1452, 1462, and 1472.

The radiation absorbing layer 1430 converts incident photons into the first electrical signal S1.

The first through third comparators 1451, 1461, and 1471 respectively compare the first electrical signal S1 with the plurality of reference values ref11, ref12, and ref13 and sort the photons according to a plurality of energy bands.

Hereinafter, in each unit detector, a reference value that is input to the first comparator may be referred to as the first reference value, a reference value that is input to the second comparator may be referred to as the second reference value, and a reference value that is input to the third comparator may be referred to as the third reference value. For example, in the first unit detector 1570, a reference value that is input to the first comparator 1451 is referred to as the first reference value ref11, a reference value that is input to the second comparator 1461 is referred to as the second reference value ref12, and a reference value that is input to the third comparator 1471 is referred to as the third reference value ref13. In detail, the first comparator 1451 compares the first electrical signal S1 with the first reference value ref11. The second comparator 1461 compares the first electrical signal S1 with the second reference value ref12. The third comparator 1471 compares the first electrical signal S1 with the third reference value ref13.

The first through third counters 1452, 1462, and 1472 count and store the number of photons that are sorted according to a plurality of energy bands.

The first through third counters 1452, 1462, and 1472 may have sizes corresponding to reference values that are used to sort photons. In detail, as described with reference to FIG. 11, when the first reference value ref11, the second reference value ref12, and the third reference value ref13 are respectively set to 30 keV, 60 keV, and 90 keV, the first counter 1452 counts the number of photons having energy that is equal to or greater than 30 keV, and stores the counted number of the photons. The second counter 1462 counts the number of photons having energy that is equal to or greater than 60 keV, and the third counter 1472 counts the number of photons having energy that is equal to or greater than 90 keV.

Referring to FIG. 11, the number of photons having energy that is equal to or greater than 30 keV is proportional to the area 1116 of graph 1115, the number of photons having energy that is equal to or greater than 60 keV is proportional to the area 1126 of graph 1125, and the number of photons having energy that is equal to or greater than 90 keV is proportional to the area 1136 of graph 1135.

Accordingly, the first counter 1452 may have a size corresponding to the area 1116, the second counter 1462 may have a size corresponding to the area 1126, and the third counter 1472 may have a size corresponding to the area 1136.

Also, at least one of first through third reference values ref11, ref12, and ref13 that are used in the first unit detector 1570 from among the plurality of unit detectors may be different from at least one of a plurality of reference values, that is, first through third reference values, ref21, ref22, and ref23, that are used in the second unit detector 1580. For example, two reference values, such as the second and third reference values ref12 and ref13, that are input to two comparators, such as the second and third comparators 1461 and 1471, that are included in the first unit detector 1570 may be different from two reference values, such as the second and third reference values ref22 and ref23, that are input to their two corresponding comparators 1486 and 1491 that are included in the second unit detector 1580.

Also, at least one of the first through third reference values ref11, ref12, and ref13 that are used in the first unit detector 1570 may be the same as at least one of the first through third reference values ref21, ref22, and ref23 that are used in the second unit detector 1580.

In detail, a reference value for sorting a lowermost energy band may be set to be the same in the first unit detector 1570 and the second unit detector 1580. When a multi-image CT image is generated, information about a low energy band may be the most important. Accordingly, a reference value for the low energy band may be set to be the same, and photons may be sorted in the same low energy band in all unit detectors that are included in the radiation detector 1510.

That is, the first reference value ref11 that is used to sort a low energy band from among a plurality of reference values that are used in the first unit detector 1570 may be the same as the first reference value ref21 that is used to sort a low energy band from among a plurality of reference values that are used in the second unit detector 1580.

Also, at least one of the first through third reference values ref11, ref12, and ref13 that are used in the first unit detector 1570 may be different by a predetermined offset from at least one of the first through third reference values ref21, ref22, and ref23 that are used in the second unit detector 1580.

For example, both the first reference value ref11 and the first reference value ref21 may correspond to 20 keV. The other reference values are different in the first unit detector 1570 and the second unit detector 1580. In detail, the second reference value ref12 corresponds to 60 keV, and the second reference value ref22 corresponds to 75 keV. The third reference value ref13 corresponds to 90 keV, and the third reference value ref23 corresponds to 105 keV. That is, the first reference values ref11 and ref21 may be the same in the first unit detector 1570 and the second unit detector 1580, and the second reference values ref12 and ref22 and the third reference values ref13 and ref23 may be set to be different by a predetermined offset of about 15 keV in the first unit detector 1570 and the second unit detector 1580.

In the above example, the first unit detector 1570 may count the number of photons having energy that is equal to or greater than 30 keV, 60 keV, and 90 keV. The second unit detector 1580 may count the number of photons having energy that is equal to or greater than 30 keV, 75 keV, and 105 keV.

Also, the CT imaging apparatus 1500 may further include an I/O unit 1530 (e.g., inputter/outputter, or I/O device). The I/O unit 1530 outputs a user interface screen for receiving a plurality of reference values. The user interface screen that is output from the I/O unit 1530 will be explained below in detail with reference to FIGS. 16 and 17.

In detail, the I/O unit 1530 may include a display unit 1531 and an input unit 1532. The display unit 1531 and the input unit 1532 may correspond to the display unit 130 and the input unit 128 of FIG. 2.

The display unit 1530 displays an image on a display panel. In detail, the display unit 1530 may display a medical image that is generated by using radiation that is detected by the radiation detector 1510. Also, the display unit 1530 may display the user interface screen.

The input unit 1532 receives a predetermined request or command, or other data from a user.

For example, the input unit 1532 may include an input device such as at least one of a touch pad, a mouse, a keyboard, or an input device including hard keys for inputting predetermined data. For example, the user may input a predetermined command by manipulating at least one of the touch pad, the mouse, the keyboard, and the input device that are included in the input unit 1532.

Also, the I/O unit 1530 may be formed as a touchscreen. In detail, the input unit 1532 includes the touchpad (not shown) that is combined with a display panel (not shown) that is included in the display unit 1531 and outputs the user interface screen to the display panel. When a predetermined command is input through the touchscreen, the touchpad may detect the predetermined command.

In detail, when the I/O unit 1530 is formed as a touchscreen, the input unit 1531 may output the user interface screen on the display panel with which the touchpad is combined. When the user touches a predetermined point of the user interface screen, the input unit 1532 detects the touched point. The input unit 1532 may recognize the user's request or command corresponding to a menu option displayed on the detected point and may perform the recognized request or command.

Also, the CT imaging apparatus 1500 may further include a power supply unit 1550 (e.g., power supplier). The power supply unit 1550 supplies predetermined power to the radiation detector 1510.

In detail, the power supply unit 1550 generates voltages corresponding to reference values and applies the voltages to the first through third comparators 1451, 1461, and 1471 of the first unit detector 1570.

For example, when reference values are voltage signals, the power supply unit 1550 may include a voltage divider (not shown) and may apply a plurality of voltages that are generated to comparators of a unit detector by using the voltage divider. For example, the voltage divider may generate other reference values (for example, 30 keV, 60 key, 75 keV, and 90 keV) by using a voltage (for example, 105 keV) corresponding to a highest reference value.

Alternatively, when reference values are alternating current (AC) signal values, the power supply unit 1550 may include a digital-to-analog converter (DAC) 1551 and may apply current signals corresponding to a plurality of reference values to comparators to a unit detector by using the DAC 1551.

Figure 16:
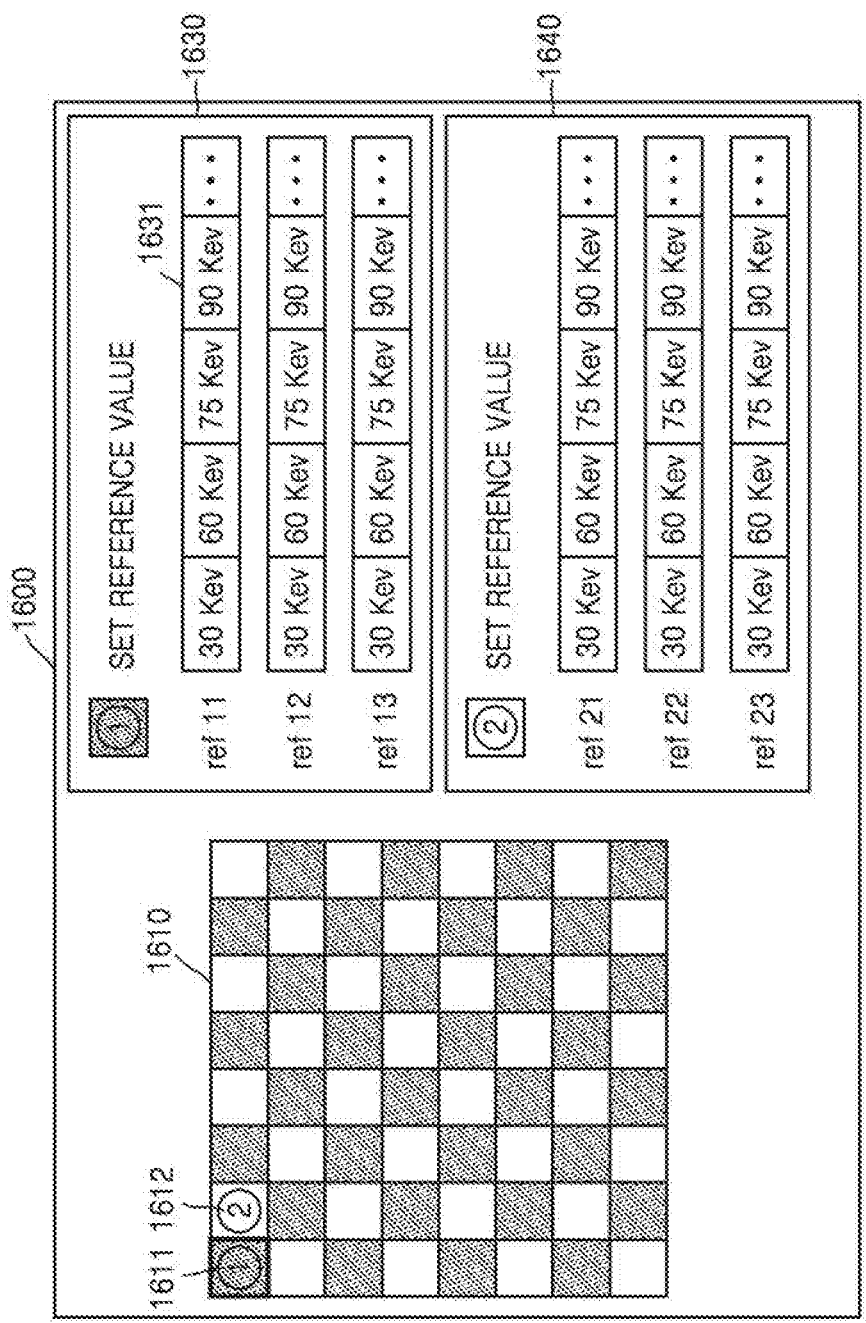
FIG. 16 is a diagram illustrating a user interface screen that is output from the tomography imaging apparatus, according to an exemplary embodiment.

FIG. 16 is a diagram illustrating a user interface screen 1600 that is output from a tomography imaging apparatus or an X-ray imaging apparatus, according to an exemplary embodiment.

Referring to FIG. 16, the I/O unit 1530 may display the user interface screen 1600, and may receive reference values via the displayed user interface screen 1600.

Referring to FIG. 16, the user interface screen 1600 may include a menu screen 1610 indicating unit detectors that have reference values that are to be set, and menu screens 1630 and 1640 for setting a reference value according to a unit detector.

Accordingly, a user may set reference values of unit detectors that are included in a radiation detector by using the user interface screen 1600. For example, as described with reference to FIG. 9A, reference values for a first unit detector 1611 that is dark and a second unit detector 1612 that is bright may be set. The first unit detector 1611 and the second unit detector 1612 respectively correspond to the first unit detector 1570 and the second unit detector 1580 of FIG. 15, and thus a repeated description thereof will not be given here.

That is, the first through third reference values ref11, ref12, and ref13 that are used in the first unit detector 1611 may be set by using the menu screen 1630 for setting a reference value of the first unit detector 1611. Also, the first through third reference values ref21, ref22, and ref23 that are used in the second unit detector 1612 may be set by using the menu screen 1640 for setting a reference value of the second unit detector 1612. Although a reference value is set by using a menu window 1631 that may select a reference value in FIG. 16, the present exemplary embodiment is not limited thereto, and a reference value may be set by using a menu window that may directly input a reference value.

Also, in the radiation detector, a plurality of unit detectors may be grouped, and reference values may be set according to the grouped unit detectors.

Figure 17:
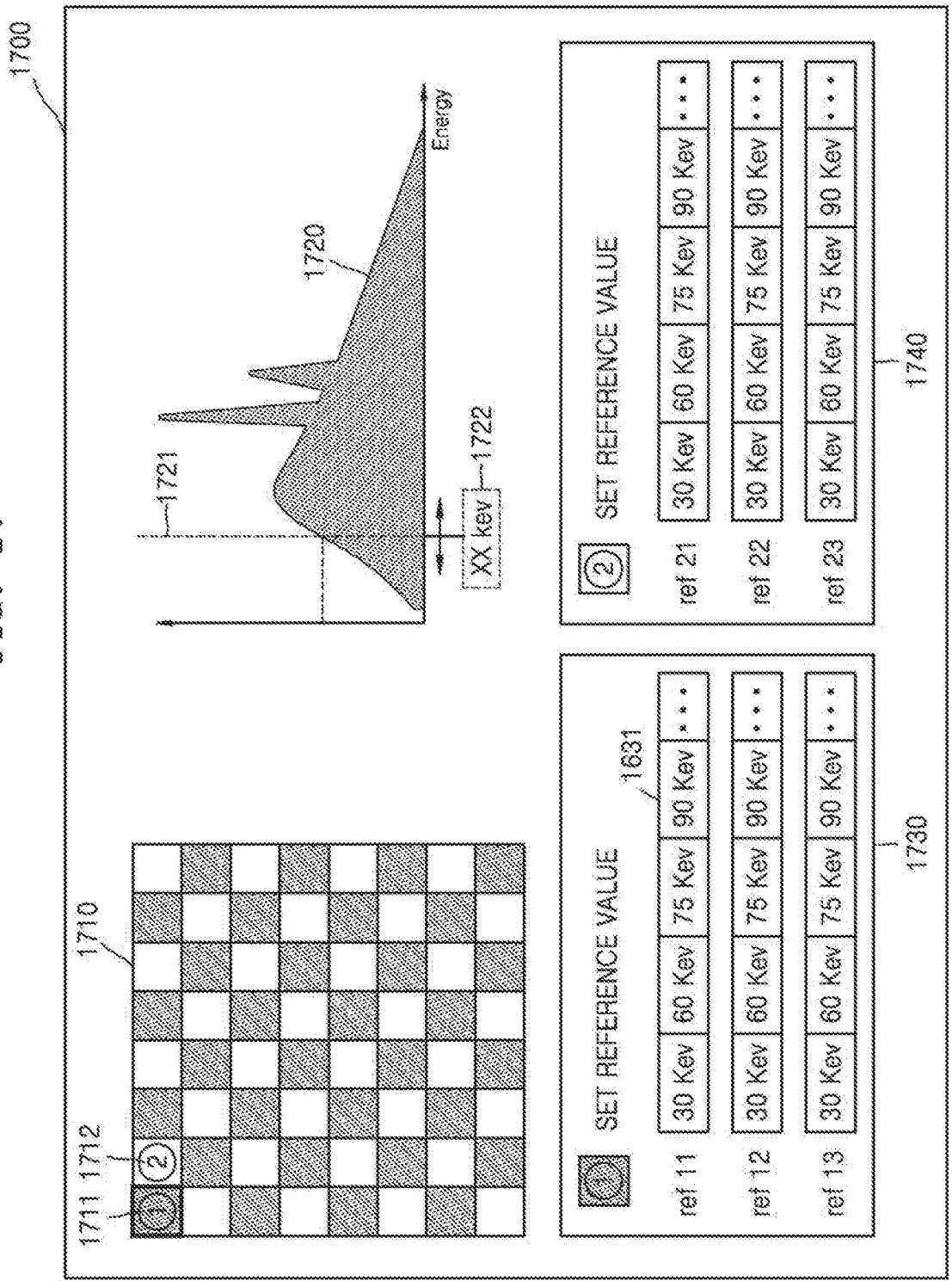
FIG. 17 is a diagram illustrating a user interface screen that is output from the tomography imaging apparatus, according to another exemplary embodiment.

FIG. 17 is a diagram illustrating a user interface screen 1700 that is output from the CT imaging apparatus 1500, according to another exemplary embodiment.

Referring to FIG. 17, the I/O unit 1530 may display the user interface screen 1700 and may receive reference values by using the displayed user interface screen 1700.

Referring to FIG. 17, the user interface screen 1700 may include a menu screen 1710 indicating unit detectors that have reference values that are to be set, and menu screens 1730 and 1740 for setting a reference value according to a unit detector.

The menu screen 1710 that indicates a unit detector corresponds to the menu screen 1610 of FIG. 16, and thus a detailed explanation thereof will not be given here.

Referring to FIG. 17, the user interface screen 1700 may display an energy spectrum 1720 that indicates an energy distribution of photons that are incident on a radiation detector. A user may see the energy spectrum 1720 and may easily recognize an energy band of the photons.

For example, a cursor 1721 may be located on the energy spectrum 1720 to display an energy value of a point at which the cursor 1721 is located on a menu window 1722. Also, a predetermined reference value may be set by selecting the point at which the cursor 1721 is located. For example, when the first reference value ref11 of the first unit detector 1711 is to be set, the cursor 1721 may be located at a predetermined position, a mouse may be double-clicked, and an energy value of the predetermined position may be input as the first reference value ref11.

Also, when at least one of the first through third reference values ref11, ref12, and ref13 that are used in the first unit detector 1570 is different by a predetermined offset from at least one of the first through third reference values ref21, ref22, and ref23 that are used in the second unit detector 1580, the user interface screen 1700 that is output from the I/O unit 1530 may be a user interface screen for receiving at least one of the first through third reference values ref11 that are used in the first unit detector 1711, the first through third reference values ref21, ref22, and ref23 that are used in the second unit detector 1712, and the predetermined offset.

For example, when the first through third reference values ref11, ref12, and ref13 and the first through third reference values ref21, ref22, and ref23 are set to be different by a predetermined offset, the user interface screen 1700 may include a menu screen for setting the predetermined offset. In this case, when the user respectively sets the first through third reference values ref11, ref12, and ref13 to 30 keV, 60 keV, and 90 keV and the predetermined offset to +15 keV, the first through third reference values ref21, ref22, and ref23 may be automatically respectively set to 45 keV, 75 keV, and 105 keV.

Also, the power supply unit 1550 may generate power corresponding to reference values that are input through the user interface screen 1700 and may supply the power to a plurality of comparators. For example, when the power supply unit 1550 includes the DAC 1551, the DAC 1551 may apply current signals corresponding to a plurality of reference values that are set via the user interface screen to comparators of a unit detector.

Figure 18:
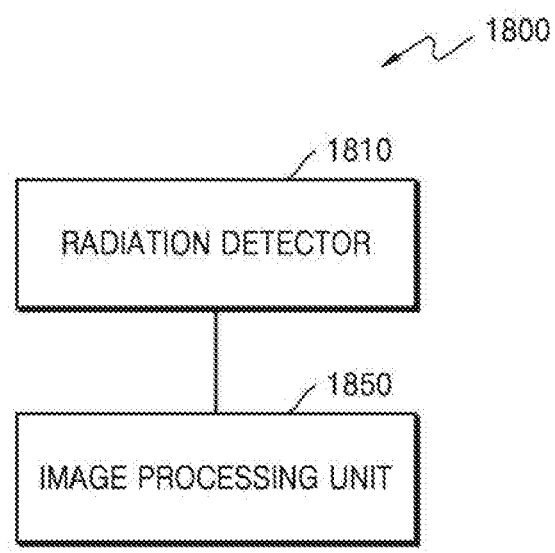
FIG. 18 is a diagram illustrating a tomography imaging apparatus according to another exemplary embodiment.

FIG. 18 is a diagram illustrating a CT imaging apparatus 1800 according to another exemplary embodiment.

Referring to FIG. 18, the CT imaging apparatus 1800 includes a radiation detector 1810 and an image processing unit 1850 (e.g., an image processor).

The radiation detector 1810 includes unit detectors that detect radiation. The unit detectors may correspond to any of the unit detectors of FIGS. 7A, 7B, 7C, 13, and 14. Also, the radiation detector 1810 may correspond to any of the radiation detectors of FIGS. 1A through 17, and thus a repeated description thereof will not be given here.

The image processing unit 1850 obtains a medical image based on a quantity of photons detected by the radiation detector 1810. For example, the image processing unit 1850 may reconstruct a tomography image, for example, a CT image, based on a quantity of X-ray photons detected by the radiation detector 1810. Alternatively, the image processing unit 1850 may reconstruct an X-ray image based on a quantity of X-ray photons detected by the radiation detector 1810. Alternatively, the image processing unit 1850 may generate an OCT image, a PET-CT image, a dual energy CT image, or a dual energy X-ray image based on a quantity of photons detected by the radiation detector 1810. The following will be explained based on the assumption that the image processing unit 1850 restores a CT image.

In detail, the image processing unit 1850 may be included in the CT system 100. For example, the image processing unit 1850 may correspond to the image processing unit 126 of FIG. 2. Alternatively, the image processing unit 1850 may correspond to a medical apparatus 136 that is connected through the wired and/or wireless network 301 to the CT system 100. The image processing unit 1850 may be connected to various external devices over the Internet.

In detail, when each of a plurality of pixels includes the unit detector 700 and an operation of counting radiation is performed in units of pixels, one image pixel value of a CT image may be generated by using the number of photons that are counted by at least one pixel. For example, one image pixel value of a CT image may be generated by using the number of photons that are counted by one pixel included in the radiation detector 1810.

Also, in the radiation detector 1810, when one pixel includes a plurality of sub-pixels that each include a unit detector and an operation of counting radiation is performed in units of sub-pixels, one image pixel value of a CT image may be generated by using the number of photons that are counted by at least one sub-pixel.

For example, one image pixel value of a CT image may be generated by using the number of photons that are counted by one sub-pixel. In FIG. 7A, one image pixel value of a first image corresponding to an energy band equal to or greater than 30 keV may be generated by using the number of photons that are counted by the first counter 733. One image pixel value of a second image corresponding to an energy band equal to or greater than 60 keV may be generated by using the number of photons that are counted by the second counter 743. One image pixel value of a third image corresponding to an energy band equal to or greater than 90 keV may be generated by using the number of photons that are counted by the third counter 753.

Alternatively, the number of photons that are counted by a plurality of sub-pixels may correspond to one image pixel value of a restored image. In detail, a plurality of sub-pixels may be grouped, and one image pixel value of a CT image may be generated by using the number of photons counted by one group including the plurality of sub-pixels.

Figure 19A:
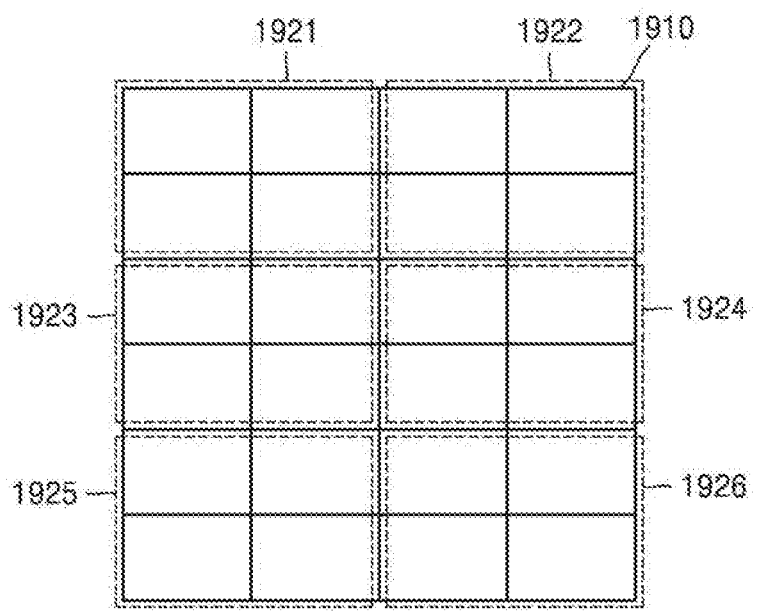
FIGS. 19A and 19B are diagrams for explaining a method of generating an image pixel value of a tomography image, according to an exemplary embodiment.
Figure 19B:
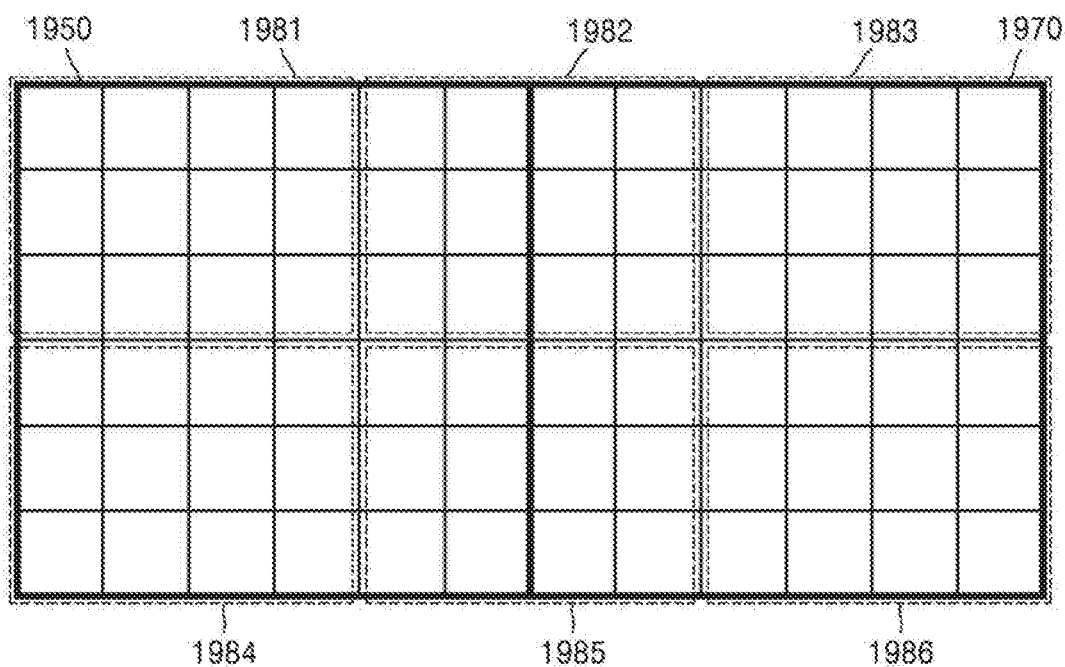

FIGS. 19A and 19B are diagrams for explaining a method of generating an image pixel value of a CT image, according to an exemplary embodiment.

In FIG. 19A, one pixel 1910 includes 24 sub-pixels (6*4 sub-pixels). In FIG. 19B, one pixel 1950 or 1970 includes 36 sub-pixels (6*6 sub-pixels).

Referring to FIG. 19A, a total number of photons that are counted by one of the sub-pixel groups 1921, 1922, 1923, 1924, 1925, and 1926, which each may include a plurality of adjacent sub-pixels, may correspond to one image pixel value. In detail, a total number of photons that are counted by one sub-pixel group, for example, the sub-pixel group 1921, corresponds to one image pixel value of a restored CT image. Also, one 'sub-pixel group' (for example, 1921) may be referred to as one 'counting pixel group'.

In detail, one image pixel value of a restored image according to an energy band may be generated by using the number of photons according to energy bands that are counted by a sub-pixel group, for example, the sub-pixel group 1921.

In detail, referring to FIG. 19A, one pixel 1910 includes 6 counting pixel groups 1921, 1922, 1923, 1924, 1925, and 1926. Since the counting pixel groups 1921, 1922, 1923, 1924, 1925, and 1926 may be image pixels for forming one pixel value, one pixel 1910 may include 6 image pixels. Accordingly, the number of counting pixel groups included in a radiation detector may be equal to or greater than the number of pixels included in the radiation detector. Also, a size of a counting pixel group (for example, 1921) may be equal to or less than a size of the pixel 1910.

In FIG. 19A, one sub-pixel group corresponding to one image pixel value exemplarily includes 4 sub-pixels. In this case, when one pixel includes 24 sub-pixels (6*4 sub-pixels), one pixel (e.g., 1910) may be divided into 6 groups (3*2 groups) and one pixel may generate 6 image pixel values in a restored image.

Alternatively, 24 sub-pixels that are included in one pixel may be divided into 4 sub-pixel groups of 6 sub-pixels each, and one pixel may generate 4 image pixel values in a restored image.

Referring to FIG. 19B, two pixels 1950 and 1970 are disposed adjacent to each other.

In the one pixel 1910, a plurality of sub-pixels that are included in a plurality of pixels may be divided into a plurality of groups, and the number of photons that are counted by one of the groups may correspond to one image pixel value of a restored image.

Referring to FIG. 19B, 72 sub-pixels that are included in the two pixels 1950 and 1970 may be divided into 6 groups 1981, 1982, 1983, 1984, 1985, and 1986. In detail, one image pixel value of a restored image may be determined by a total number of photons that are counted by 12 sub-pixels that are included in one group, for example, the group 1981.

The image processing unit 1850 may adjust the number of sub-pixels that are used to generate one image pixel value of a restored CT image according to a resolution of the restored CT image. For example, when a CT image having an ultra-high resolution is to be generated, the image processing unit 1850 may generate one image pixel value of a restored CT image by using the number of photons that are counted by one sub-pixel.

As described above, a radiation detector, a tomography imaging apparatus thereof, and an X-ray imaging apparatus thereof, according to the one or more exemplary embodiments, may minimize a size of a pixel and may increase the number of distinguished energy bands.

In the radiation detector, the tomography imaging apparatus thereof, and the X-ray imaging apparatus thereof, each of a plurality of pixels included in the radiation detector includes a plurality of counting pixels and each of the plurality of counting pixels individually performs an operation of counting the number of photons and an operation of storing the counted number of the photons. That is, since an operation of counting the number of photons is performed in each counting pixel, when about n photons are incident on one pixel and the one pixel includes m counting pixels, the number of photons to be processed per counting pixel is reduced to n/m. Accordingly, a sampling time of 1/(n/m) second per photon may be ensured. That is, a sampling time per photon is 1/m seconds in a radiation detector of the related art that performs an operation of counting the number of photons and storing the counted number of photons in each pixel whereas a sampling time is 1/(n/m) seconds per photon, which is m times the sampling time of 1/m second of the radiation detector of the related art, in the radiation detector of the inventive concept. Accordingly, the accuracy of counting the number of photons may be improved, and photons absorbed by a radiation absorbing layer may be sufficiently counted. Also, since the number of photons to be processed by one storage unit is reduced to n/m, the problem of the radiation detector of the related art that when photons are simultaneously incident, the photons may not be correctly counted, may be reduced.

The exemplary embodiments may be written as computer programs and may be implemented in general-use digital computers that execute the programs using a computer-readable recording medium.

Examples of the computer-readable recording medium include magnetic storage media (e.g., ROM, floppy disks, hard disks, etc.), optical recording media (e.g., CD-ROMs, DVDs, etc.), etc.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A radiation detecting apparatus for detecting radiation, the radiation detecting apparatus configured to restore an image, the radiation detecting apparatus comprising:
   a plurality of image pixels, each image pixel of the plurality of image pixels comprising at least two counting pixels including a first counting pixel and a second counting pixel adjacent to the first counting pixel,
   wherein the first counting pixel comprises:
      a first radiation absorbing layer configured to convert first photons incident on the first radiation absorbing layer into a first electrical signal;
      a first low comparator configured to determine whether the first electrical signal is equal to or greater than a first low reference value;
      a first low counter configured to count and store a number of the first photons based on the an output of the first low comparator;
      a first high comparator configured to determine whether the first electrical signal is equal to or greater than a first high reference value;
      a first high counter configured to count and store the number of the first photons based on an output of the first high comparator; and
      a first middle comparator configured to compare the first electrical signal with a first middle reference value,
   wherein the second counting pixel comprises:
      a second radiation absorbing layer configured to convert second photons incident on the second radiation absorbing layer into a second electrical signal,
      a second low comparator configured to determine whether the second electrical signal is equal to or greater than a second low reference value;
      a second low counter configured to count and store a number of the second photons based on an output of the first low comparator;
      a second high comparator configured to determine whether the second electrical signal is equal to or greater than a second high reference value,
      a second high counter configured to count and store the number of the second photons based on an output of the second high comparator, and
      a second middle comparator configured to compare the second electrical signal with a second middle reference value,
   wherein the first high reference value is different from the second high reference value, and
   wherein at least one of the first high reference value and the first middle reference value is different by a predetermined offset from at least one of the second high reference value and the second middle reference value.

2. The radiation detecting apparatus of claim 1, further comprising an input/output (I/O) device configured to output a user interface screen that enables a user to set at least one of a plurality of reference values.

3. The radiation detecting apparatus of claim 2, further comprising a power supplier configured to generate a plurality of voltages respectively corresponding to the plurality of reference values that are input via the user interface screen and apply the plurality of voltages to a plurality of comparators.

4. The radiation detecting apparatus of claim 2, further comprising a digital-to-analog converter (DAC) configured to generate current corresponding to the plurality of reference values that are input via the user interface screen and supply the current to a plurality of comparators.

5. The radiation detecting apparatus of claim 1, wherein each of the at least two counting pixels has a size equal to or less than 1 millimeter squared ($mm^2$).

6. The radiation detecting apparatus of claim 1, wherein sizes of the first low counter, the first high counter, the second low counter, and the second high counter respectively vary according to the first low reference value, the first high reference value, the second low reference value, and the second high reference value.

7. The radiation detecting apparatus of claim 1, further comprising an I/O device configured to output a user interface screen that enables a user to set at least one of the first low reference value, the first middle reference value, the first high reference value, the second low reference value, the second middle reference value, the second high reference value, and the predetermined offset.

8. A tomography imaging apparatus configured to restore an image and comprising:
   a radiation detector,
   wherein the radiation detector comprises a plurality of image pixels, each image pixel of the plurality of image pixels comprising at least two counting pixels including a first counting pixel and a second counting pixel adjacent to the first counting pixel,
   wherein the first counting pixel comprises:
      a first radiation absorbing layer configured to convert first photons incident on the first radiation absorbing layer into a first electrical signal;
      a first low comparator configured to determine whether the first electrical signal is equal to or greater than a first low reference value;
      a first low counter configured to count and store a number of the first photons based on the an output of the first low comparator;
      a first high comparator configured to determine whether the first electrical signal is equal to or greater than a first high reference value; and
      a first high counter configured to count and store the number of the first photons based on an output of the first high comparator; and
      a first middle comparator configured to compare the first electrical signal with a first middle reference value;
   wherein the second counting pixel comprises:
      a second radiation absorbing layer configured to convert second photons incident on the second radiation absorbing layer into a second electrical signal;
      a second low comparator configured to determine whether the second electrical signal is equal to or greater than a second low reference value;
      a second low counter configured to count and store a number of the second photons based on an output of the first low comparator;
      a second high comparator configured to determine whether the second electrical signal is equal to or greater than a second high reference value;
      a second high counter configured to count and store the number of the second photons based on an output of the second high comparator; and
      a second middle comparator configured compare the second electrical signal with a second middle reference value,
   wherein the first high reference value is different from the second high reference value, and
   wherein at least one of the first high reference value and the first middle reference value is different by a predetermined offset from at least one of the second high reference value and the second middle reference value.

* * * * *